(12) United States Patent  
Sato et al.

(10) Patent No.: US 9,256,372 B2  
(45) Date of Patent: Feb. 9, 2016

(54) STORAGE DEVICE AND METHOD OF CONTROLLING STORAGE DEVICE

(71) Applicant: HITACHI, LTD., Tokyo (JP)

(72) Inventors: Noriaki Sato, Odawara (JP); Masayuki Kikuchi, Chigasaki (JP); Keisuke Matsumoto, Odawara (JP); Takashi Chikusa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/810,351

(22) PCT Filed: Dec. 5, 2012

(86) PCT No.: PCT/JP2012/007787  
§ 371 (c)(1),  
(2) Date: Jan. 15, 2013

(87) PCT Pub. No.: WO2014/087453  
PCT Pub. Date: Jun. 12, 2014

(65) Prior Publication Data  
US 2015/0309739 A1   Oct. 29, 2015

(51) Int. Cl.  
*G06F 12/00* (2006.01)  
*G06F 13/00* (2006.01)  
*G06F 13/28* (2006.01)  
*G06F 3/06* (2006.01)

(52) U.S. Cl.  
CPC .............. *G06F 3/0619* (2013.01); *G06F 3/065* (2013.01); *G06F 3/067* (2013.01); *G06F 3/0665* (2013.01)

(58) Field of Classification Search  
None  
See application file for complete search history.

(56) References Cited

U.S. PATENT DOCUMENTS

| | | | |
|---|---|---|---|
| 8,312,231 B1 * | 11/2012 | Li ........................ | G06F 12/0875 711/118 |
| 2004/0088379 A1 | 5/2004 | Aoshima et al. | |
| 2006/0218370 A1 * | 9/2006 | Satoyama ............. | G06F 3/0605 711/170 |
| 2010/0070726 A1 * | 3/2010 | Ngo ..................... | G06F 11/1464 711/162 |
| 2012/0191929 A1 | 7/2012 | Zietzke et al. | |
| 2013/0191589 A1 * | 7/2013 | Smith ................. | G06F 11/2733 711/114 |

\* cited by examiner

*Primary Examiner* — Yaima Rigol  
(74) *Attorney, Agent, or Firm* — Volpe and Koenig, P.C.

(57) ABSTRACT

It is an object of the present invention to suppress inconsistency of mount information necessary for mounting a volume in a storage device having a primary volume and a secondary volume.

The storage device according to the present invention creates a memory region storing the mount information necessary for mounting the secondary volume, saves a snapshot thereof, and presents a virtual volume which has been created by using the snapshot and the data in the secondary volume to an external device.

12 Claims, 31 Drawing Sheets

Fig. 6D
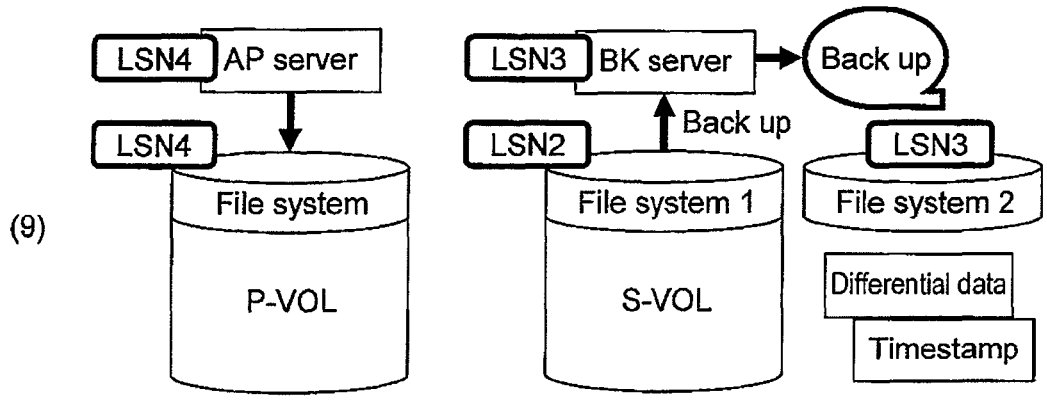
(9)
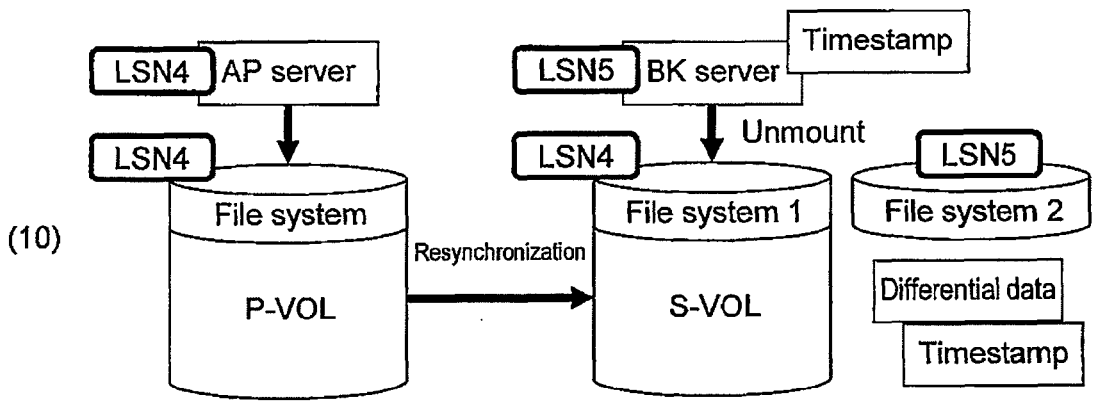
(10)
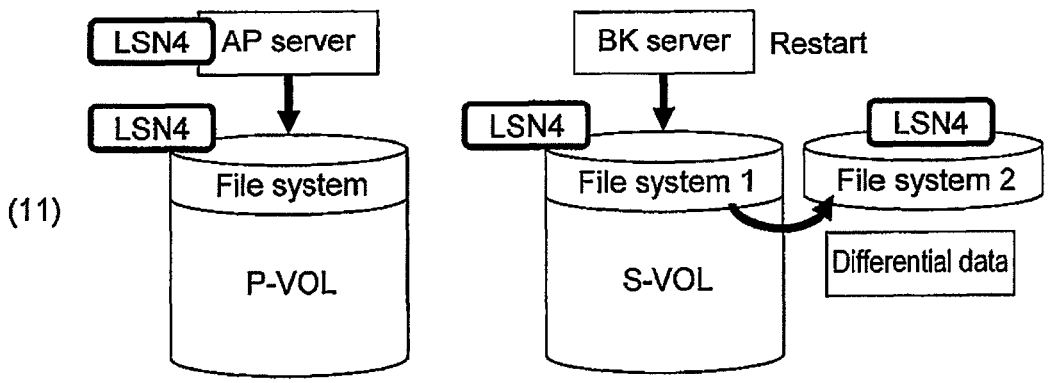
(11)

Fig. 7

| P-VOL ID (LUN) 1301 | S-VOL ID (LUN) 1302 | The number of P-VOL blocks (memory capacity) 1303 | Paired state 1304 | Meta-VOL ID (LUN) 1305 | The number of meta-VOL blocks (memory capacity) 1306 | The number of detected PBS 1307 | Virtual-VOL enable flag 1308 | Meta-VOL management table 1309 | FS update differential data number 1310 |
|---|---|---|---|---|---|---|---|---|---|
| P01 (000) | S01 (100) | 02000000h (16GB) | Sync | M01 (200) | 00080000h (262MB) | 1 | Enabled | P001 | 1 |
| P02 (001) | S02 (101) | 04000000h (33GB) | Simplex | M02 (201) | 00080000h (262MB) | 2 | Disabled | P002 | 2,3 |
| P03 (002) | S03 (102) | 02000000h (16GB) | Sync | N/A | N/A | 0 | — | — | — |
| .. | .. | .. | .. | .. | .. | .. | .. | .. | .. |

| Entry number 1401 | Meta-VOL ID (LUN) 1402 | File-system ID 1403 | File-system-region start LBA 1404 | The number of allocated blocks 1405 | S-VOL LBA 1406 | Status 1407 | Timestamp 1408 | FS update metadata start LBA 1409 | The number of consumed blocks 1410 |
|---|---|---|---|---|---|---|---|---|---|
| P001 | M01 (200) | M2001 | 00000000h | 100000h | 00000100h | Still | 2012/08/18 10:20:30 | 00100000h | 1234h |
| P002 | M02 (201) | M2011 | 00000000h | 100000h | 00000100h | Disabled | N/A | 00200000h | 0 |
|  | M02 (201) | M2011 | 00100000h | 100000h | 02000100h | Disabled | N/A | — | — |
| P003 | M03 (202) | M2021 | 00000000h | 100000h | 00000100h | Temporarily still | N/A | 00100000h | 56h |
| .. | .. | .. | .. | .. | .. | .. | .. | .. | .. |

| P-VOL ID (LUN) | S-VOL ID (LUN) | The number of P-VOL blocks (memory capacity) | Paired state | LSN automatic adjustment flag | The number of detected PBS | LSN management table | LSN adjustment flag |
|---|---|---|---|---|---|---|---|
| P01 (000) | S01 (100) | 02000000h (16GB) | Restore | Enabled | 1 | P001 | Y |
| P02 (001) | S02 (101) | 04000000h (33GB) | Simplex | Disabled | 2 | P002 | — |
| P03 (002) | S03 (102) | 02000000h (16GB) | Sync | — | 0 | — | — |
| .. | .. | .. | .. | .. | .. | .. | .. |

Fig. 21

| Entry number 1501 | P-VOL ID (LUN) 1502 | File system ID 1503 | PBS top LBA 1504 | MFT top LBA 1505 | Log-file top LBA 1506 | LSN1 stored position (data length) 1507 | LSN2 stored position (data length) 1508 | LSN 1509 | Timestamp 1510 |
|---|---|---|---|---|---|---|---|---|---|
| P001 | P01 (000) | F011 | 00000200h | 00000210h | 00040100h | 00000h (08h) | 00400h (08h) | 00001 234h | 2012/08/18 10:20:30 |
| P002 | P02 (001) | F021 | 00000200h | 00000210h | 00040100h | | | Disabled | N/A |
| | P02 (001) | F022 | 00100200h | 00100210h | 02040100h | | | Disabled | N/A |
| .. | .. | .. | .. | .. | .. | .. | .. | .. | .. |

150

STORAGE DEVICE AND METHOD OF CONTROLLING STORAGE DEVICE

TECHNICAL FIELD

The present invention relates to a storage device.

BACKGROUND ART

Along with recent increases in data capacity, the importance of reliable and highspeed backup/restore techniques has been increasing. For example, in a backup utilizing a Volume Shadow copy Service (VSS), which is a general-purpose framework of Microsoft Corporation, when applications, backup software, and adapter software supporting VSS work together, a hot backup of data can be carried out without stopping online applications.

When performing a backup, a process in which a server mounts/unmounts volumes on a storage device occurs. In the technique described in below-described PTL 1, when a server is to unmount volumes, signatures of, for example, an MBR (Master Boot Record) and a PBS (Partition Boot Sector) are cleared, and the volumes are completely unmounted (for example, see FIG. 4 of the literature).

CITATION LIST

Patent Literature

PTL 1: US Patent Publication No. 2012/0191929

SUMMARY OF INVENTION

Technical Problem

When a backup server is to back up a volume on a storage device, in some cases, first, a pair of a primary volume and a secondary volume is generated by copying the volume on the storage device, and the backup server carries out a backup via the secondary volume. In this case, the backup server mounts the secondary volume every time the backup is carried out and, when the backup is completed, unmounts the secondary volume.

In the above-described backup procedure, mount information which is necessary for the backup server to mount the secondary volume is overwritten, and the backup server cannot find out this. As a result, when the backup server is to mount the secondary volume again, the secondary volume may be recognized as a different volume.

For example, when a file system that obtains transaction logs of the file system like a Windows (registered trademark) File System is used, an OS (Operating System) verifies log sequence numbers (LSN) of the transaction logs when a volume is mounted/unmounted in order to check consistency of the file system. If the LSN is overwritten, the OS recognizes this volume as a volume that is different from the previous volume.

The failure as described above can be avoided at a certain level by completely unmounting the volume from the server-side OS so that discrepancy of the mount information does not occur. For example, in the Windows OS, a volume is unmounted by using a mountvol/p command, thereby completely unmounting the volume from the OS; therefore, it is conceived that the above-described inconsistency does not occur.

However, upon completion of unmounting the volume, a working process handle is once cut off, and the OS has to be restarted in some cases. The above-described mountvol/p command also corresponds to this. When the OS is restarted, operation is temporarily stopped; therefore, it is desired to carry out a backup while avoiding a restart as much as possible.

On the other hand, it is also conceived that a problem as described above related to a restart is avoided at a certain level by using an unmount command that deletes only a mount point while maintaining the volume-mounted state on the OS. In the Windows OS, a mountvol/d command corresponds to this. However, this case has a problem in that, when the server is to re-mount a volume, the server recognizes the volume as a different volume due to the previously described inconsistency of the mount information.

In the technique described in PTL 1, a problem similar to that described above may occur since the volume is completely unmounted. Specifically, the OS has to be restarted in the process of unmounting and re-mounting the volume.

The present invention has been accomplished in view of the above-described problems, and it is an object to, in a storage device having a primary volume and a secondary volume, suppress inconsistency of the mount information which is necessary for mounting the volumes.

Solution to Problem

A storage device according to the present invention creates a memory region in which mount information necessary for mounting a secondary volume is stored, saves a snapshot thereof, and presents a temporary virtual volume which has been created by using the snapshot and data in the secondary volume, to an external device.

Advantageous Effects of Invention

According to the storage device of the present invention, even in a case in which mount information may be overwritten, inconsistency of volumes can be suppressed.

BRIEF DESCRIPTION OF DRAWINGS

FIG. 6D is drawings explaining the procedure of carrying out a backup while suppressing the above-described inconsistency of file system information in the computer system 1000 according to the first embodiment.

FIG. 7 is a drawing showing a configuration of a pair-volume management table 130 which is stored in a shared memory 117 in a controller 110, and an example of data thereof.

FIG. 8 is a drawing showing a configuration of a metadata-volume management table 140 which is stored in the shared memory 117 in the controller 110, and an example of data thereof.

FIG. 20 is a drawing showing a configuration of a pair-volume management table 130 and an example of data thereof in the second embodiment.

FIG. 21 is a drawing showing a configuration of an LSN management table 150 which is stored in the shared memory 117 in the controller 110, and an example of data thereof.

DESCRIPTION OF EMBODIMENTS

First Embodiment

System Configuration

Figure 1:
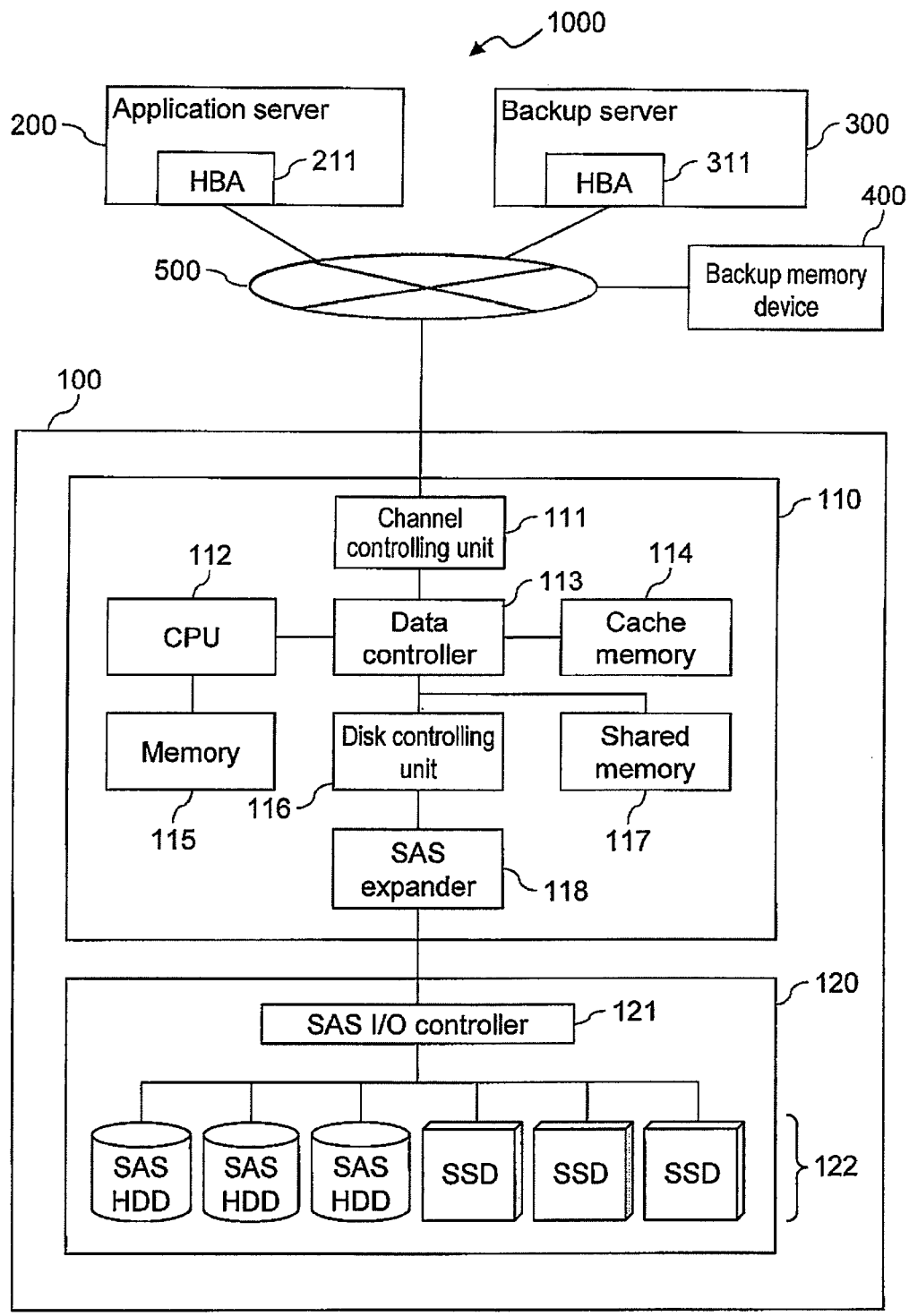
FIG. 1 is a configuration diagram of a computer system 1000 according to a first embodiment.

FIG. 1 is a configuration diagram of a computer system 1000 according to a first embodiment of the present invention. The computer system 1000 comprises a storage device 100, an application server 200, a backup server 300, and a backup memory device 400; and these devices are connected via a network 500.

The storage device 100 is a memory device which stores data used by the application server 200, and comprises a controller 110 and a drive chassis 120, and is connected to the network 500 via the controller 110.

The controller 110 comprises a channel controlling unit 111, a CPU (Central Processing Unit) 112, a data controller 113, a cache memory 114, a memory 115, a disk controlling unit 116, a shared memory 117, and a SAS (Serial Attached SCSI) expander 118.

The channel controlling unit 111 controls the connection to/from the network 500. The CPU 112 implements main functions of the controller 110 by executing programs in which main operations of the controller 110 are described. The data controller 113 controls input/output of data. The cache memory 114 temporarily saves data read from a disk device group 122, which will be described later. The memory 115 stores data, etc. used by the CPU 112. The disk controlling unit 116 controls operations of the disk device group 122. The shared memory 117 is a memory commonly used in the controller 110. The SAS expander 118 is a relay device having an interface for connection to a plurality of SAS devices.

The drive chassis 120 is a chassis which houses the disk device group 122, and comprises a SAS I/O controller 121. The SAS I/O controller 121 controls an interface between the disk device group 122 and the controller 110. The disk device group 122 is one or more disk devices supporting the interface of the controller 110 side, and disk devices such as SAS hard disk devices (HDD), a Solid State Drive (SSD), and a SATA HDD can be used, but the devices are not limited thereto. A similar thing applies to the interface of the controller 110 side.

The application server 200 is a server which executes applications by using data stored in the storage device 100, and is connected to the storage device 100 via an appropriate interface such as an HBA (Host Bus Adapter) 211 and the network 500.

The backup server 300 is a server which backs up the data stored in the storage device 100 or restores the backed up data with respect to the storage device 100, and is connected to the storage device 100 via an appropriate interface such as an HBA 311 and the network 500.

The backup memory device 400 is a device which stores backup target data obtained by the backup server 300 from the storage device 100, and can be configured by using, for example, a tape drive device.

Figure 2:
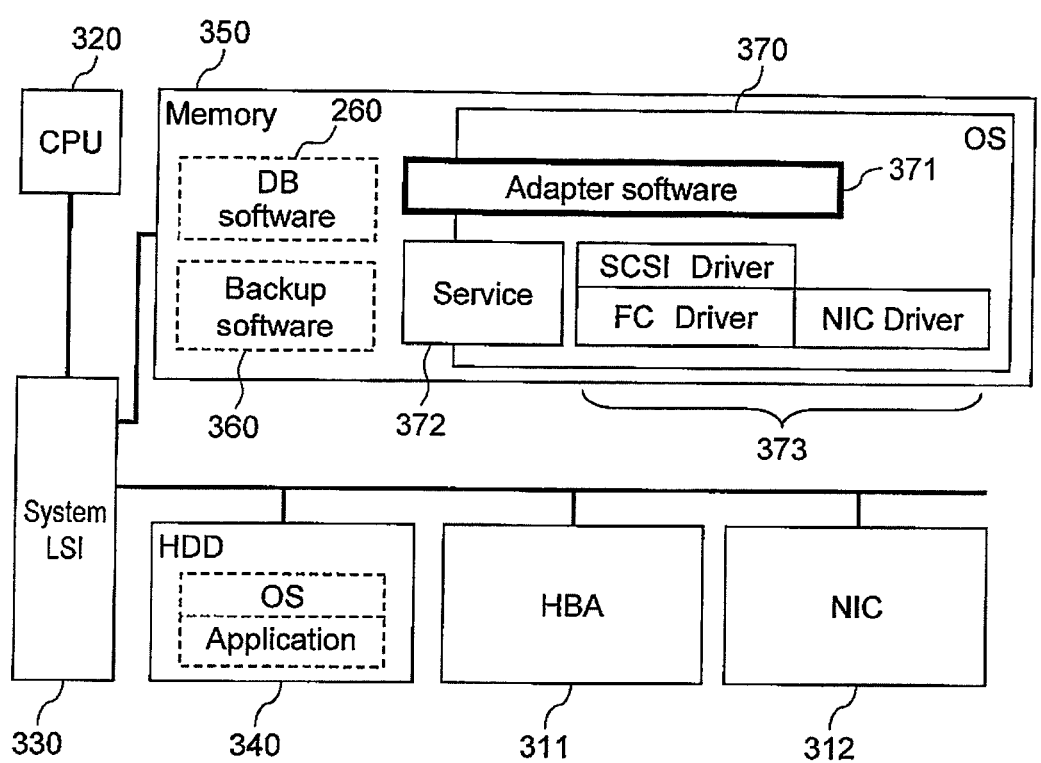
FIG. 2 is a configuration diagram of a backup server 300.

FIG. 2 is a configuration diagram of the backup server 300. The backup server 300 comprises a configuration in which a CPU 320, an HDD 340, a memory 350, the HBA 311, and a MC (Network Interface Card) 312 are connected via a system LSI 330 and a system bus. For the convenience of explanation, DB (DataBase) software 260 executed by the application server 200 is also described.

The CPU 320 reads software such as an OS 370 and backup software 360 (the DB software 260 on the application server 200) from the HDD 340 to the memory 350 and executes the software. The OS 370 includes adapter software 371, a Volume Shadow copy Service (VSS, hereinafter, referred to as "service") 372, and a driver group 373.

Hereinafter, for the convenience of description, each of the software is sometimes explained as an actor. However, it is noted that, in practice, the software is executed by computing devices such as the CPU 320.

When the backup software 360 on the backup server 300 is to execute a backup, the backup software 360 notifies the service 372 which is on the backup server 300 of that fact. The service 372 notifies a service which is similarly executed on the application server 200 of that fact and orders the DB software 260 to flush a cache. The DB software 260 flushes data with respect to the storage device 100 via the driver group 373. When the flushing is completed, the service 372 executes the backup in conjunction with the backup software 360 by a process explained in later-described FIG. 6 and thereafter.

Figure 3:
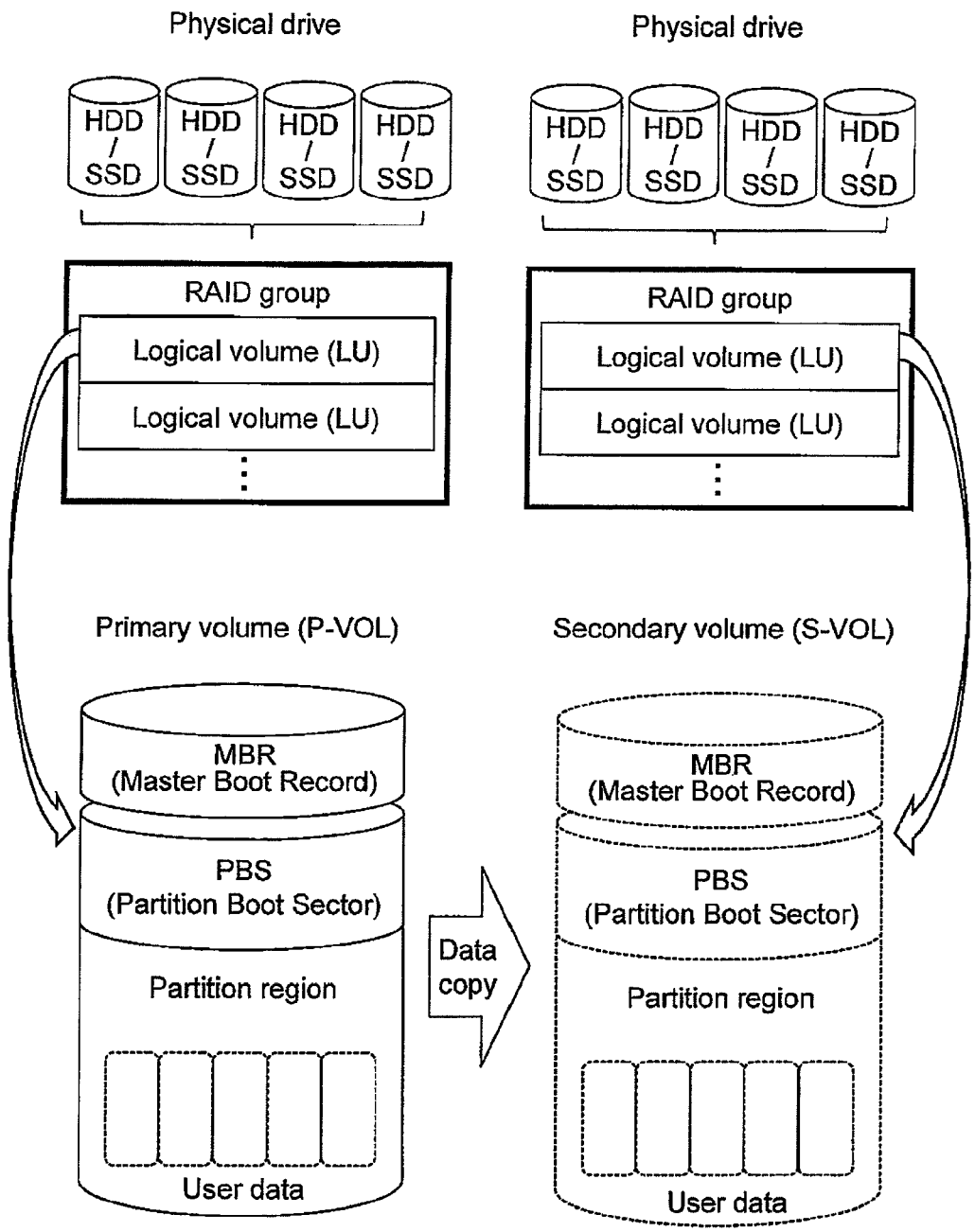
FIG. 3 is a drawing showing a configuration example of volumes presented by a storage device 100 to external devices.

FIG. 3 is a drawing showing a configuration example of volumes presented by the storage device 100 to external devices (in the present first embodiment, the application server 200 and the backup server 300). The disk devices constituting the disk device group 122 constitute a RAID group. In the RAID group, logical volumes (Logical Unit: LU), which are logically-sectioned memory regions, are formed. OSs of the external devices mount the logical volumes, as a result, they can recognize the logical volumes and read/write data.

The logical volume includes an MBR (Master Boot Record), a PBS (Partition Boot Sector), and a partition region. The MBR is a boot sector disposed at the top of the logical volume. The partition region is a memory region which stores data main body, and one or more partition regions can be provided in one logical volume. The PBS is a boot sector disposed at the top of the partition region. A set of PBS and the partition region can constitute one file system.

When a volume used by the application server 200 is to be backed up by the backup server 300, the storage device 100 presents a new volume which has been created by copying the volume to the backup server 300. The backup server 300 carries out the backup with respect to the copied volume. The volume used (or mounted) by the application server 200 is referred to as a primary volume, and the volume used (or mounted) by the backup server 300 is referred to as a secondary volume.

Figure 4:
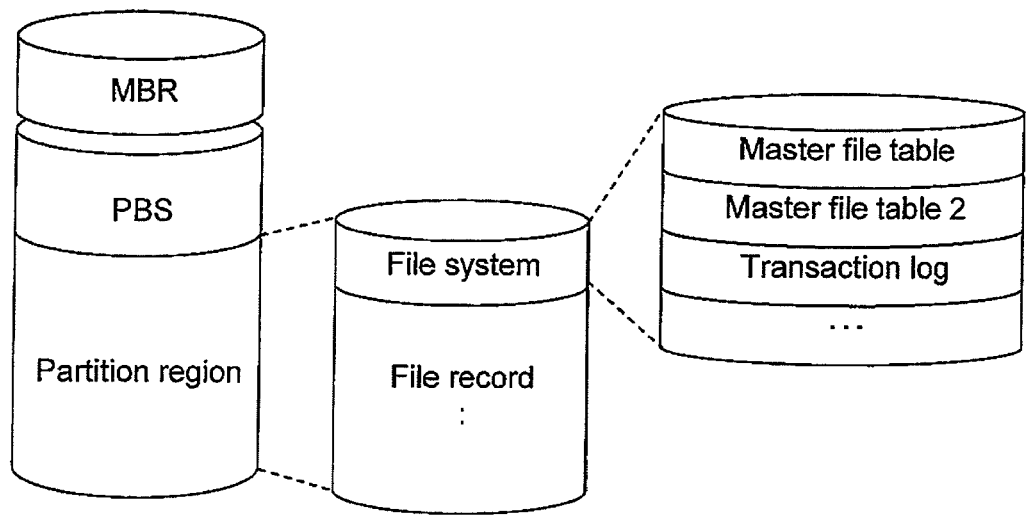
FIG. 4 is a drawing showing details of a partition region explained in FIG. 3.

FIG. 4 is a drawing showing details of the partition region explained in FIG. 3. Herein, a configuration of an NTFS file system for Windows is taken as an example. At the top of the partition region, a system file (file system information) defining the configuration of a file system stored in the partition region is stored. Subsequent to the file system information, a data main body stored by the file system is stored.

The file system information includes a master file table (MFT), a master file table 2, a transaction log, and other information. The master file table stores base file records of files and folders of NTFS volumes. The master file table 2 is a copy image of the first 4 records of the MFT and is provided for compensating for a 1-sector fault in a case in which there is access to the MFT. The transaction log is a log file storing a list of transaction steps for recovering the NTFS file system and is used for restoring consistency of the NTFS when a system fault occurs.

The above-described transaction log further includes a log sequence number (LSN) and a preceding LSN. The log sequence number is an identifier for uniquely identifying a transaction log record. The preceding LSN retains a reference with respect to a preceding transaction log record. Therefore, the transaction log has a coupled-list-like structure.

First Embodiment

Outline of Backup Operation

Figure 5:
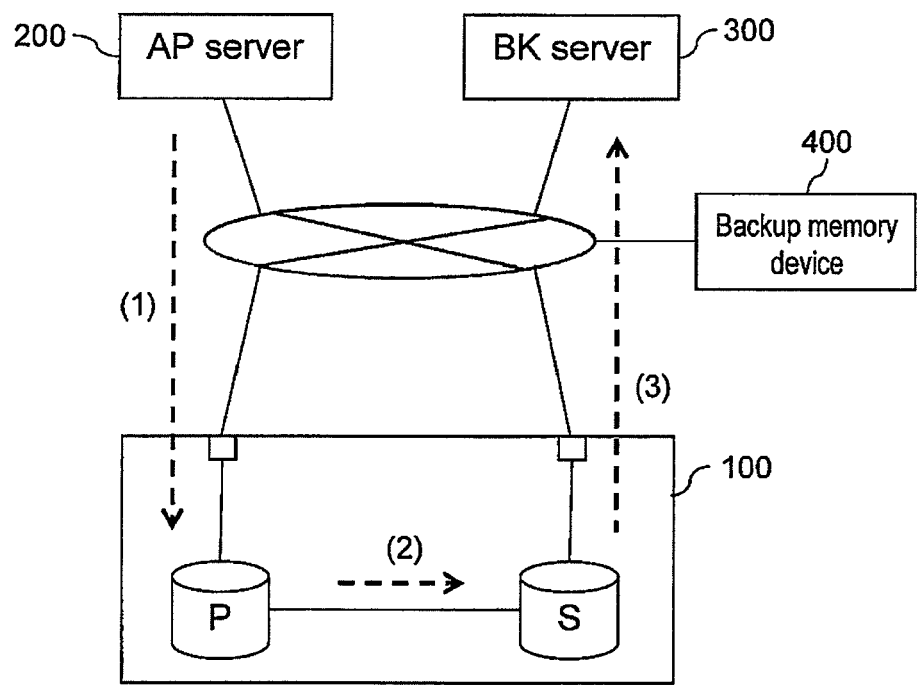
FIG. 5 is a drawing explaining operations of devices at the time when the backup server 300 carries out a backup.

FIG. 5 is a drawing explaining operations of the devices at the time when the backup server 300 carries out the backup. Hereinafter, an outline of a backup procedure will be explained in accordance with FIG. 5.

(FIG. 5: Step (1): Flush Data)

The backup server 300 starts an initial backup process in accordance with an order from a user or a specified backup schedule. An order is given to the application server 200 via the service 372 on the backup server 300 to flush data. In accordance with the order, the DB software 260 flushes the data (in a DB application, DB is caused to freeze). The adapter software on the application server 200 stores data which is necessary for causing the DB to freeze, in the primary volume of the storage device 100.

(FIG. 5: Step (2): Split Secondary Volume)

When the flushing of the data is completed, the service on the application server 200 orders the storage device 100 to split the secondary volume in a paired state (pair cancellation). In this process, the data (update differential data) which has been written to the primary volume before the split is ordered is copied to the secondary volume. After the split is ordered, the DB software 260 resumes the DB.

(FIG. 5: Step (3): Back up Secondary Volume)

The service 372 of the backup server 300 mounts the secondary volume. The backup software 360 copies backup target data which is in the secondary volume to the backup memory device 400. When the backup is completed, the service 372 unmounts the secondary volume. In this process, a command (for example, mountvol/d) that deletes only a mount point while maintaining the mount state viewed from the OS is used so that a process handle is not cut off.

In the above-described Steps (2) to (3), the application server 200 continues data writing to the primary volume. Therefore, the file system information may be overwritten and updated on the primary volume. Eventually, the results of the update are reflected also to the secondary volume. Then, the file system information having been recognized at the time when the backup server 300 unmounted the secondary volume is overwritten; therefore, when the backup server 300 is to mount the secondary volume the next time or thereafter, the secondary volume may be recognized as a volume different from that of the previous time. As a result, the volume cannot be mounted, a restart or the like of the backup server is required, and an appropriate backup is disturbed.

First Embodiment

System Operation

FIG. 6A to FIG. 6D are drawings explaining a procedure of carrying out a backup while suppressing the above-described inconsistency of the file system information in the computer system 1000 according to the present first embodiment. Hereinafter, steps shown in FIG. 6A to FIG. 6D will be explained.

Figure 6A:
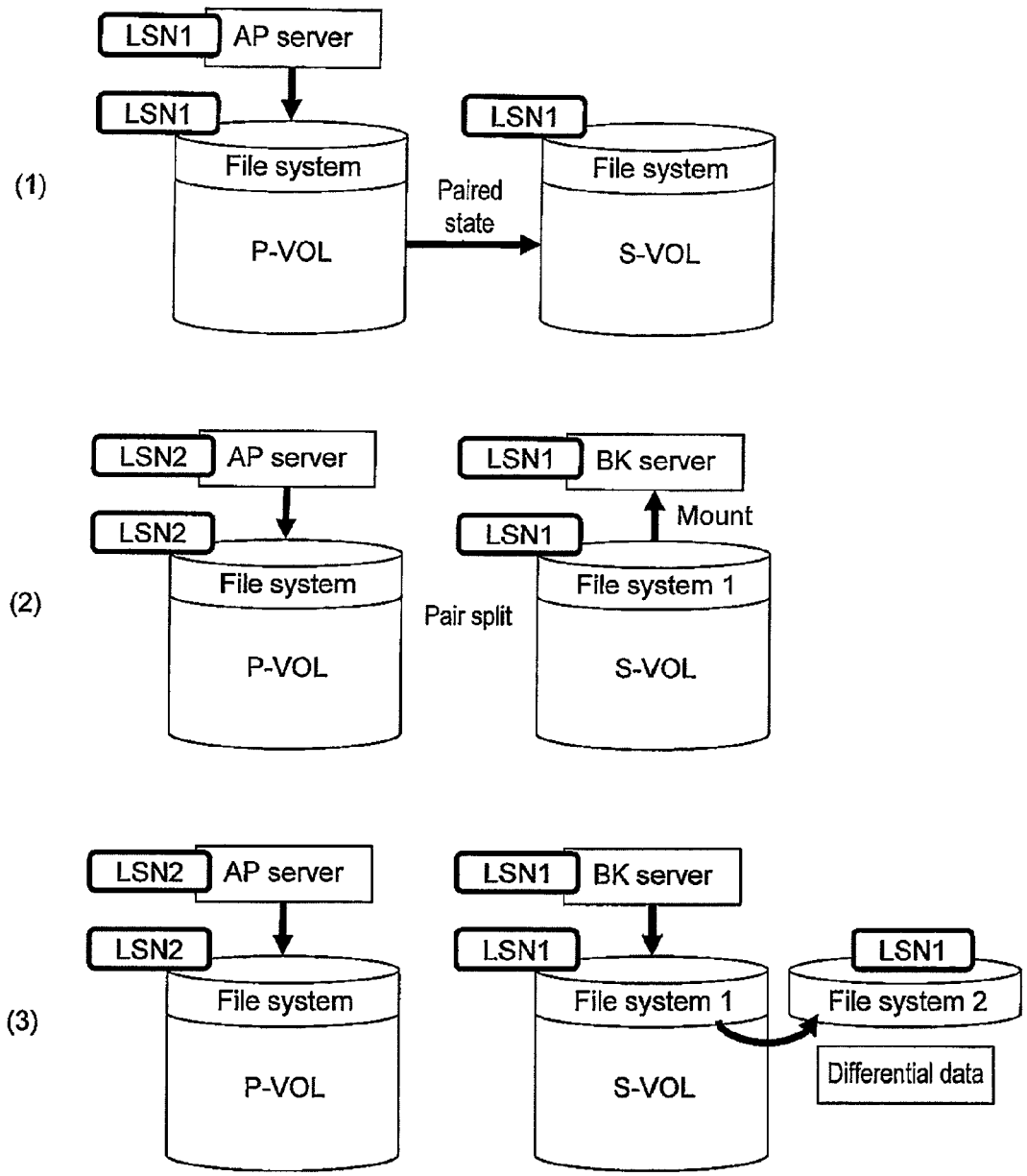
FIG. 6A is drawings explaining a procedure of carrying out a backup while suppressing the above-described inconsistency of file system information in the computer system 1000 according to the first embodiment.

(FIG. 6A: Step (1))

First, as a preparation stage, an LU (corresponding to a secondary volume) to be paired with an LU (logical volume) including the primary volume used by the application server 200 is set on the storage device 100. The LU of the secondary volume side cannot be recognized from an upper-level device (in this case, the backup server 300) while the paired state is maintained. The LSNs of the transaction logs are updated (incremented) by file manipulations from the application server 200 at the timing when a check point log is created.

(FIG. 6A: Step (1) Supplement)

At this point, all the LSNs have the same values (LSN1) since the secondary volume is synchronized with the primary volume.

(FIG. 6: Step (2))

As a result of a manipulation or the like made by an operator, the controller 110 causes the pair of the primary volume and the secondary volume to undergo a transition to a pair-split state (state in which two independent volumes are formed). The backup server 300 mounts the secondary volume, which has become independent because of the pair split. As a result, the backup server 300 becomes in a state in which a backup can be executed with respect to the secondary volume.

(FIG. 6A: Step (2): Supplement)

Since the secondary volume side is kept in the freeze state because of the pair split, the log sequence number remains as LSN1. Therefore, the backup server 300 recognizes LSN1 as the log sequence number of the file system of the secondary volume. On the other hand, since the application server 200 continues file manipulations, the LSN is updated (incremented) at the timing when the DB software 260 creates a check point log. In this case, it is assumed that LSN1 has been changed to LSN2. Thereafter, the LSN will be continuously changed. For the sake of convenience, the file system (information) of the secondary volume at this point is referred to as a file system 1.

(FIG. 6A: Step (3))

As an initial setting for the next time or thereafter, the operator sets a backup target volume with respect to the adapter software 371 on the backup server 300. The adapter software 371 orders the storage device 100 to generate a metadata volume of the LU including the set backup target volume. The controller 110 specifies the file system information in the designated LU and copies this onto the metadata volume. The controller 110 creates file-system update differential data in the metadata volume and carries out initialization. Details of the file-system update differential data will be explained again in later-described FIG. 8.

(FIG. 6A: Step (3): Supplement)

In the present step, the metadata volume created by the controller 110 is a volume which stores only the file system information of the file system present in the secondary volume. The use of this file system information will be explained again in later-described Step (8). For the sake of convenience, the file system (information) copied onto the metadata volume is referred to as a file system 2. The file system 2 has a role as a snapshot of the file system information of the secondary volume.

Figure 6B:
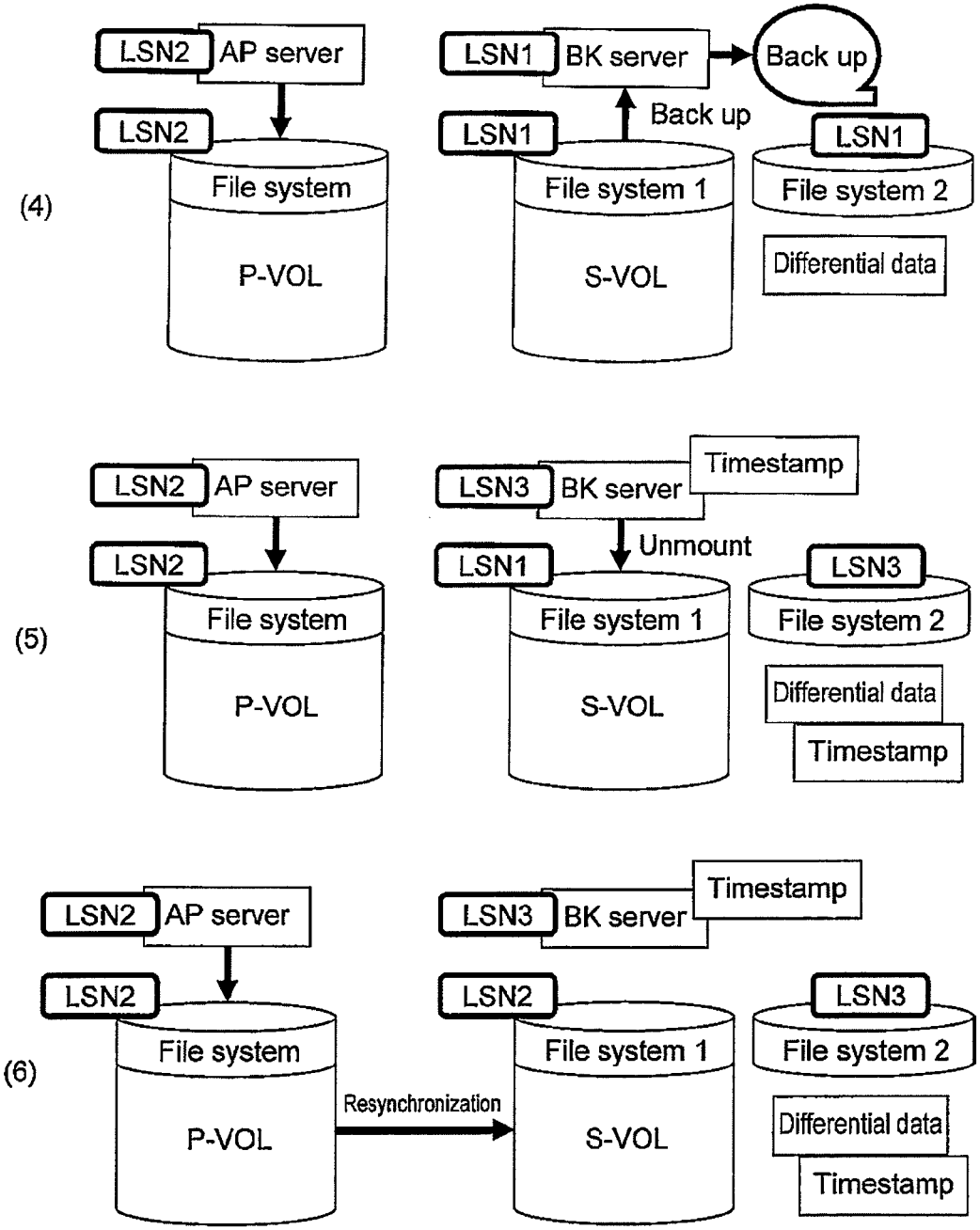
FIG. 6B is drawings explaining the procedure of carrying out a backup while suppressing the above-described inconsistency of file system information in the computer system 1000 according to the first embodiment.

(FIG. 6B: Step (4))

The backup software 360 on the backup server 300 reads the data in the backup target volume and backs it up to the backup memory device 400. During this process, the LSN of the application server 200 side is in an updatable state. The backup server 300 side carries out only data reading; therefore, the LSN is not changed, and remains as LSN1.

(FIG. 6B: Step (5))

When the backup process is completed, the backup server 300 unmounts the backup target volume (in this case, the secondary volume). At this point, the adapter software 371 on the backup server 300 orders the storage device 100 to create a snapshot of the file system information of the backup target volume. A timestamp of the current time is transmitted together with this order so that the individual snapshot can be individually identified later. The controller 110 writes the file-system update differential data to the file system 2 on the metadata volume and saves the timestamp received from the backup server 300 and file-system update differential bitmap information as the metadata of the file system 2.

(FIG. 6B: Step (5): Supplement No. 1)

In the process of carrying out the backup process, the backup server 300 sometimes updates the file system information. In the storage device 100, the file system information after the update is not written to the file system 1, but is temporarily accumulated as differential data. Then, when the snapshot creating order is received from the adapter software 371, the information is written to the file system 2 and caused to freeze as a snapshot. If the log sequence number has been updated in this process, the log sequence number on the file system 2 is also updated. In this case, it is assumed that the log sequence numbers of the backup server 300 and the file system 2 have been updated to LSN 3.

(FIG. 6B: Step (5): Supplement No. 2)

In a case in which writing to the file system 2 occurs, a differential is generated between the file system 1 and the file system 2. The controller 110 saves this differential information (update position information) as bitmap information in the file-system update differential data.

(FIG. 6B: Step (5): Supplement No. 3)

In a case in which there is writing from the backup server 300 to a file record region of the secondary volume, the controller 110 returns a write protect error. In the present step, it has been assumed that the backup server 300 can update the file system information; however, the writing thereto may be prohibited (read only). After the present step, the backup server 300 becomes in a resting state until a backup process of the next time is executed.

(FIG. 6B: Step (6))

After the backup process is completed, the controller 110 returns the primary volume and the secondary volume to the paired state again. In this process, the data on the primary volume which has been updated by the application server 200 is reflected onto the secondary volume. As a result, the file system information of the secondary volume is also synchronized with the primary volume. In this case, the log sequence number of the file system of the secondary volume is updated to LSN2.

(FIG. 6B: Step (6): Supplement)

When the file system information of the secondary volume has been updated in the present step, the controller 110 saves the update position thereof as bitmap information on the file-system update differential data. Since this bitmap information is created only for the file system information, the bitmap information has a small capacity and can be created in a short period of time compared with the snapshot of the entire volume.

Figure 6C:
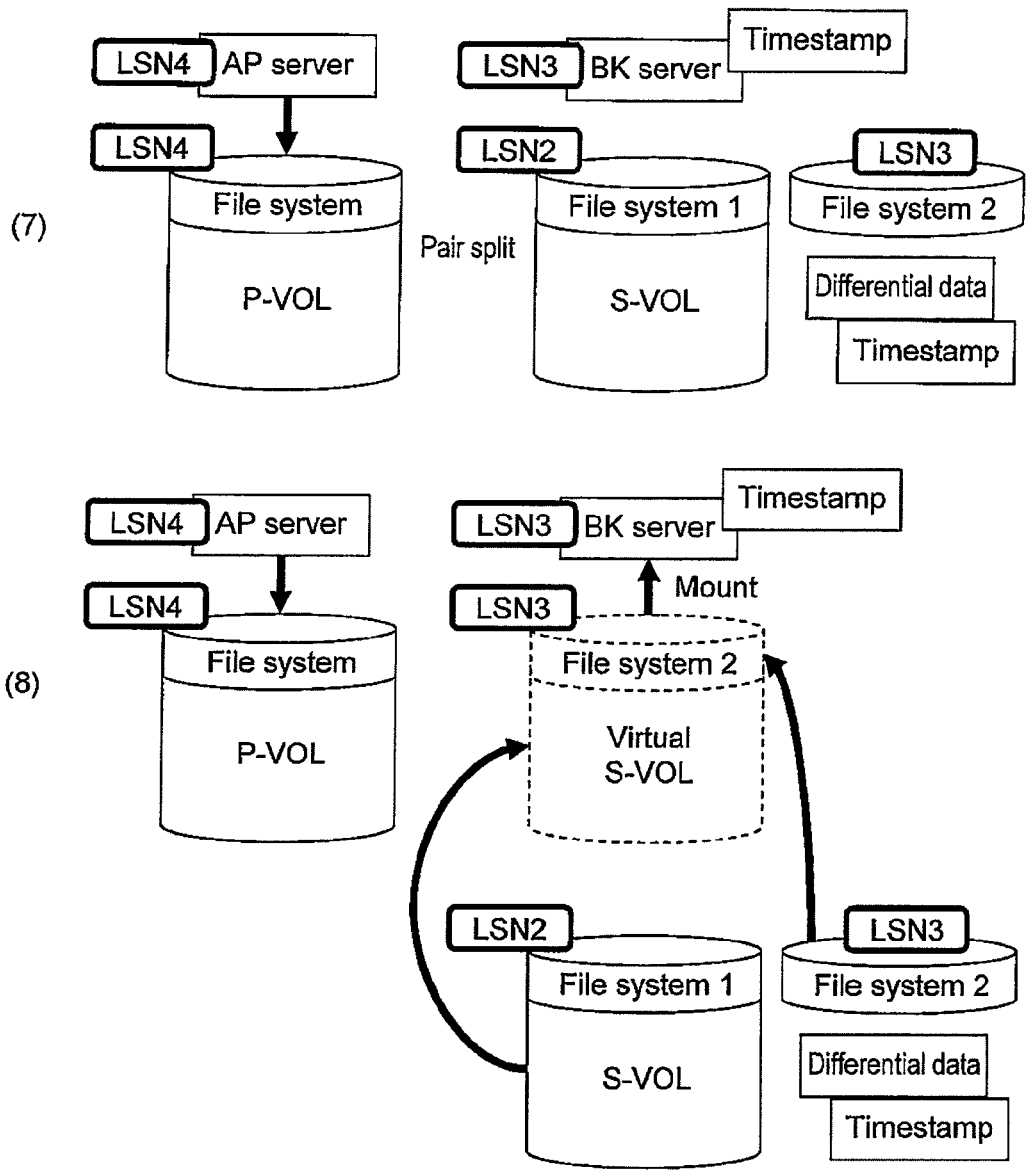
FIG. 6C is drawings explaining the procedure of carrying out a backup while suppressing the above-described inconsistency of file system information in the computer system 1000 according to the first embodiment.

(FIG. 6C: Step (7))

When reaching a backup implementation schedule of a second time, through a manipulation or the like made by the operator, the controller 110 causes the pair of the primary volume and the secondary volume to undergo a transition to the pair-split state. At this point, the log sequence number of the secondary volume side is caused to freeze at LSN2.

(FIG. 6C: Step (7): Supplement)

Since the application server 200 continues file manipulations, the LSN is updated (incremented) at the timing when a check point log is created. In this case, it is assumed that LSN2 has been changed to LSN4. As the LSN on the backup server 300, LSN3 retained in the backup server 300 side when the previous secondary volume has been unmounted is retained without change. Therefore, the log sequence number retained by the backup server 300 and the log sequence number of the file system information of the secondary volume do not match each other; therefore, the backup server 300 cannot mount the secondary volume in this state.

(FIG. 6C: Step (8))

The backup server 300 mounts the backup target volume (in this case, the secondary volume). In this process, the adapter software 371 on the backup server 300 requests the storage device 100 to generate a temporary virtual volume corresponding to the backup target volume. In this process, the timestamp at the point when the previous backup target volume has been unmounted is transmitted together. The controller 110 compares the received timestamp with the timestamp in the file-system update differential data and specifies the corresponding snapshot (file system 2) of the file system 1. The controller 110 creates a virtual volume by using the specified file system 2 and a file record region of the secondary volume and presents the virtual volume to the backup server 300. The backup server 300 mounts the presented volume as the backup target volume.

(FIG. 6C: Step (8): Supplement No. 1)

In the present step, the virtual volume created by the controller 110 uses, only for the file system information thereof, the file system information at the point when the secondary volume has been previously unmounted by the backup server 300. Therefore, even if the file system information of the secondary volume does not match the updated file system information retained by the backup server 300, the backup server 300 can mount a practically equivalent volume via the virtual volume.

(FIG. 6C: Step (8): Supplement No. 2)

When the backup server 300 has updated the file system information, this writing may be stored in the file-system update differential data, and, thereafter, the file system information of the metadata volume may be read from the file-system update differential data. However, this method can be used only until the backup process is started.

(FIG. 6D: Step (9))

When backing up the data in the backup target volume after mounting the temporary virtual volume, the backup software 360 on the backup server 300 directly reads the data from the secondary volume and backs it up to the backup memory device 400 since the temporary virtual volume is released by the controller 110.

(FIG. 6D: Step (10))

The backup server 300 unmounts the secondary volume in a manner similar to Step (5). The controller 110 creates, on the metadata volume, a snapshot of the file system 1 as a file system 2 in a manner similar to Step (5). The controller 110 returns the primary volume and the secondary volume to the paired state again in a manner similar to Step (6). It is assumed that the log sequence numbers on the backup server 300 and the file system 2 have been updated to LSN5 and that the log sequence numbers of the primary volume and the secondary volume have been updated to LSN4.

(FIG. 6D: Step (11))

When the backup server 300 is to be shut down or restarted, the adapter software 371 orders the storage device 100 to flush (synchronize) the metadata volume of the backup target volume. The controller 110 copies the region in the file-system update differential data, in which the bitmap information has been updated, onto the metadata volume (causes the file system 2 to be in a state synchronized with the file system 1), initializes the file-system update differential bitmap information, and clears the timestamp.

(FIG. 6D: Step (11): Supplement)

In the present step, the file system 1 and the file system 2 are synchronized. In this state, no differentials are generated between them; therefore, inconsistency of the file system information does not occur. Therefore, when the controller 110 is to reflect the file system information of the primary volume to the secondary volume, the controller 110 reflects the same file system also to the file system 2. Moreover, in this state, the backup server 300 is not required to use the virtual volume; therefore, the secondary volume can be directly mounted.

FIG. 7 is a drawing showing a configuration of a pair-volume management table 130 which is stored in the shared memory 117 in the controller 110, and an example of data thereof. The pair-volume management table 130 is a table in which the paired state of the primary volume and the secondary volume is managed and has primary volume IDs 1301, secondary volume IDs 1302, the numbers of primary-volume blocks 1303, the paired state 1304, metadata volume IDs 1305, the numbers of metadata-volume blocks 1306, the numbers of detected PBS1307, virtual-volume enable flags 1308, metadata-volume management tables 1309, and file-system update bitmap numbers 1310.

The primary volume ID 1301 and the secondary volume ID 1302 retain IDs (logical volume numbers) of the primary volumes and the secondary volumes, respectively. The number of the primary-volume blocks 1303 retains the number of blocks (memory capacity) used by each primary volume. The paired state 1304 retains a flag indicating whether the primary volume and the secondary volume are in the paired state or not. The metadata volume ID 1305 retains an identifier (logical volume number) of the metadata volume. The number of the metadata volume blocks 1306 retains the number of blocks (memory capacity) used by the metadata volume. The number of the detected PBS1307 retains the number of the PBS detected in the secondary volume. The virtual-volume enable flag 1308 retains a flag indicating whether the virtual volume function explained in FIG. 6 is enabled or not. The metadata-volume management table 1309 retains entry numbers 1401 on a metadata-volume management table 140 explained in later-described FIG. 8. The file-system update differential data number 1310 retains a reference number with respect to the bitmap (file-system update position data) storing the differential information of the file system 1 and the file system 2.

FIG. 8 is a drawing showing a configuration of the metadata-volume management table 140 which is stored in the shared memory 117 in the controller 110, and an example of data thereof. The metadata-volume management table 140 is a table in which the configuration of the metadata volume explained in FIG. 6 is managed, and has the entry numbers 1401, metadata volume IDs 1402, file-system IDs 1403, file-system-region start LBAs 1404, the numbers of allocated blocks 1405, secondary-volume LBAs 1406, statuses 1407, timestamps 1408, file-system update differential data start LBAs 1409, and the numbers of consumed blocks 1410.

The entry number 1401 retains a record number. The metadata volume ID 1402 corresponds to the metadata volume ID 1305. The file-system ID 1403 retains an identification number of the file system stored in the metadata volume. The file-system-region start LBA 1404 retains a start address (logical block address) of the region in which the file system information in the metadata volume is stored. The number of the allocated blocks 1405 retains a memory capacity (the number of usable blocks) of the metadata volume allocated to each file system. The secondary-volume LBA 1406 retains an address (logical block address) of the corresponding secondary volume. The status 1407 retains the information about the freeze state, etc. of the metadata volume. The timestamp 1408 retains the timestamp received from the backup server 300.

The file-system update differential data start LBA 1409 retains a start address of the file-system update differential data stored in the metadata volume. The number of the consumed blocks 1410 retains the number of the blocks which have been consumed by the file-system update differential data.

Figure 9:
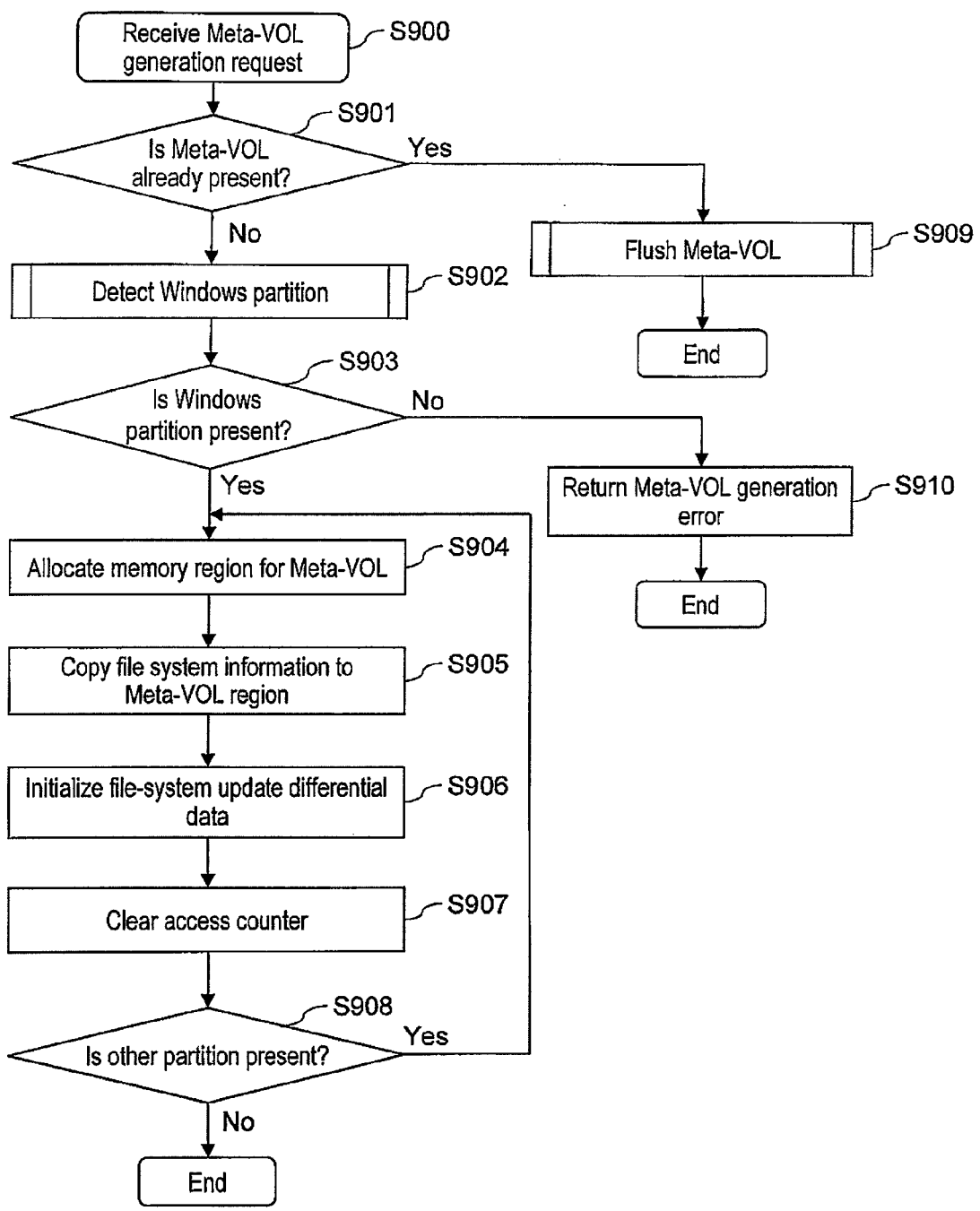
FIG. 9 is a flow chart explaining a process in which the controller 110 generates a metadata volume.

FIG. 9 is a flow chart explaining a process in which the controller 110 generates a metadata volume. Hereinafter, steps of FIG. 9 will be explained.

(FIG. 9: Step S900)

When the controller 110 receives an order from the adapter software 371 on the backup server 300 to create a metadata volume corresponding to the backup target volume, the controller 110 starts the present flow chart. The present step corresponds to Step (3) of FIG. 6.

(FIG. 9: Step S901)

The controller 110 determines whether the metadata volume corresponding to the backup target volume ordered in Step S900 has already been created or not. If the volume has already been created, the process proceeds to Step S909. If the volume has not been created, the process proceeds to Step S902.

(FIG. 9: Steps S902 to S903)

The controller 110 detects a file system (in this case, a Windows partition is taken as an example) present in the backup target volume designated in Step S900 by using a flow chart explained in later-described FIG. 10 (S902). If the file system has been detected, the process proceeds to step S904. If the file system has not been detected, the process proceeds to Step S910 (S903).

(FIG. 9: Step S902: Supplement)

In Step S902, instead of detecting the file system by the controller 110, the adapter software 371 on the backup server 300 may notify the controller 110 of the LBA of the PBS.

(FIG. 9: Steps S904 to S905)

The controller 110 allocates a memory region for creating the metadata volume (S904) and copies the file system information of the secondary volume to the memory region (S905).

(FIG. 9: Step S906)

The controller 110 initializes the file-system update differential data. Specifically, the bitmap information retained by the file-system update differential data is cleared, and records of the metadata-volume management table 140 are created. The status 1407 is set to the value indicating the state corresponding to Step (11) explained in FIG. 6.

(FIG. 9: Step S907)

The controller 110 clears an internally-retained access counter for the virtual volume. After the backup server 300 has mounted the virtual volume, the controller 110 directly presents the secondary volume to the backup server 300, but is not limited to do so; and the controller 110 may present the virtual volume to the backup server 300 for the access within a predetermined number of times. The access counter in the present step can be used for counting the above-described number of times of access.

(FIG. 9: Step S908)

The controller 110 determines whether Steps S904 to S907 have been completed or not for all the file systems in the backup target volume. If uncompleted file systems remains, the process returns to Step S904 to carry out similar processes. If all of them have been completed, the present flow chart is finished.

(FIG. 9: Step S909)

The controller 110 carries out a process of flushing the metadata volume explained in later-described FIG. 16. The present step corresponds to Step (11) explained in FIG. 6. After the present step is completed, the present flow chart is finished.

(FIG. 9: Step S910)

The controller 110 returns an error reply that generating the metadata volume has failed to the adapter software 371 on the backup server 300. After the present step is completed, the present flow chart is finished.

Figure 10:
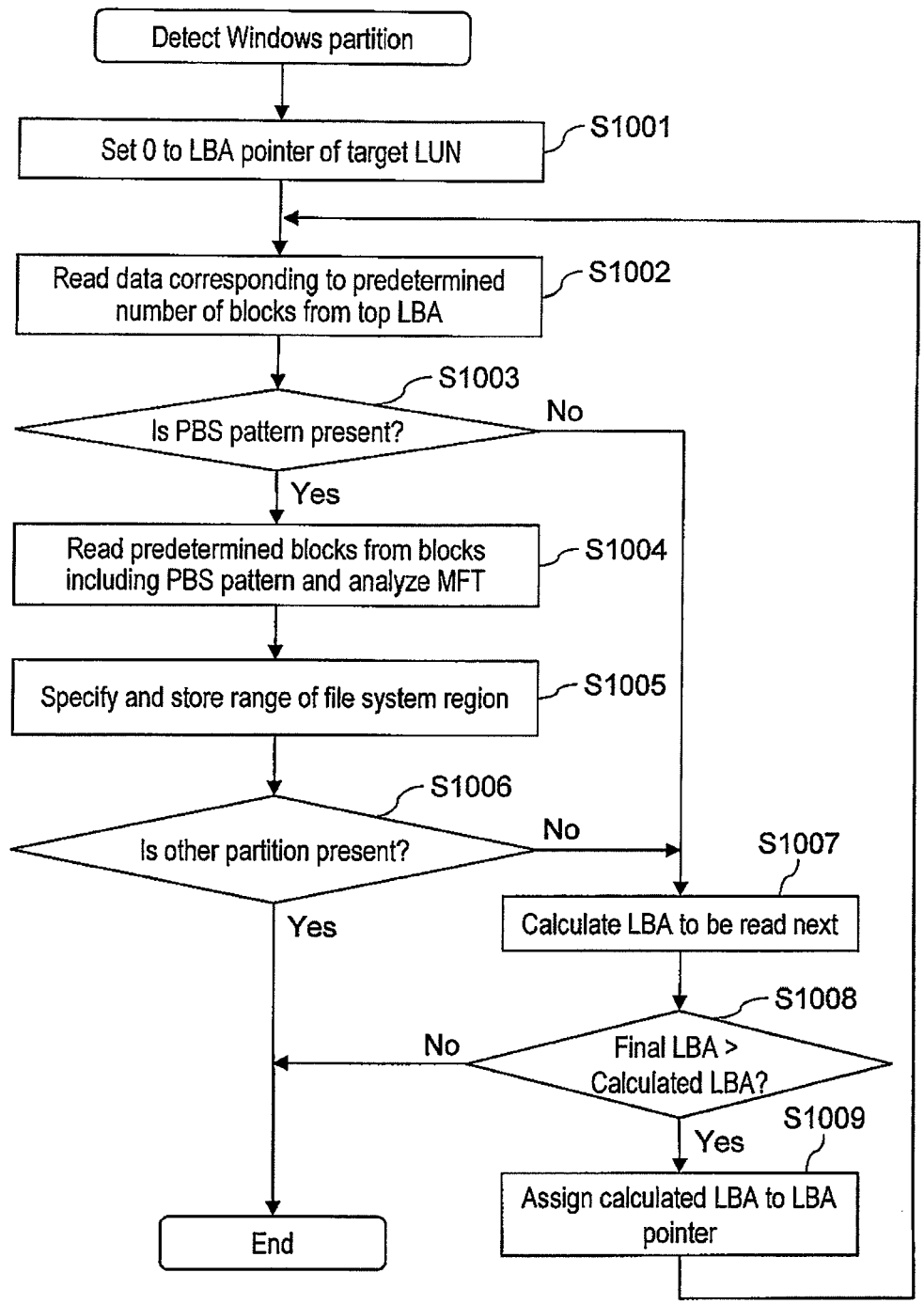
FIG. 10 is a flow chart explaining details of Step S902.

FIG. 10 is a flow chart explaining details of Step S902. Hereinafter, steps of FIG. 10 will be explained.

(FIG. 10: Steps S1001 to S1002)

The controller 110 initializes an address pointer of the backup target volume to 0 (set to a top address) (S1001). The controller 110 reads data corresponding to a predetermined number of blocks from the top address (S1002).

(FIG. 10: Step S1003)

The controller 110 determines whether a predetermined data pattern suggesting that the memory region is a PBS region is present or not in the data read in Step S1002. If the data pattern is present, the process proceeds to step S1004. If the data pattern is not present, the process proceeds to Step S1007.

(FIG. 10: Step S1003: Supplement)

For example, in the case of the NTFS file system for Windows, if a part that is the fourth byte from the top of a sector or thereafter (OEM ID) has a character string pattern of "NTFS," the part can be determined to be a PBS region. If the PBS is a GPT (GUID Partition Table), a GUID (Globally Unique IDentifier) may be searched instead of the character string pattern. Whether the file system is employing the MBR or employing the GPT can be determined by analyzing the data at the top address.

(FIG. 10: Steps S1004 to S1005)

The controller 110 reads the data corresponding to predetermined blocks from the blocks including the data pattern read in Step S1002, and obtains and analyzes a master file table (MFT) (S1004). In accordance with the description of the MFT, the controller 110 specifies and stores the region in which the file system information is stored (S1005).

(FIG. 10: Step S1006)

When it has been found out that no other file system is present in the memory region, the controller 110 finishes the present flow chart. Otherwise, the process proceeds to Step S1007.

(FIG. 10: Steps S1007 to S1009)

In accordance with the description of the MFT, the controller 110 calculates the address from which the PBS is to be read next (S1007). If the calculated address has not reached a final address of the memory region (S1008), the calculated address is assigned to the address pointer (S1009), and the process returns to Step S1002.

Figure 11:
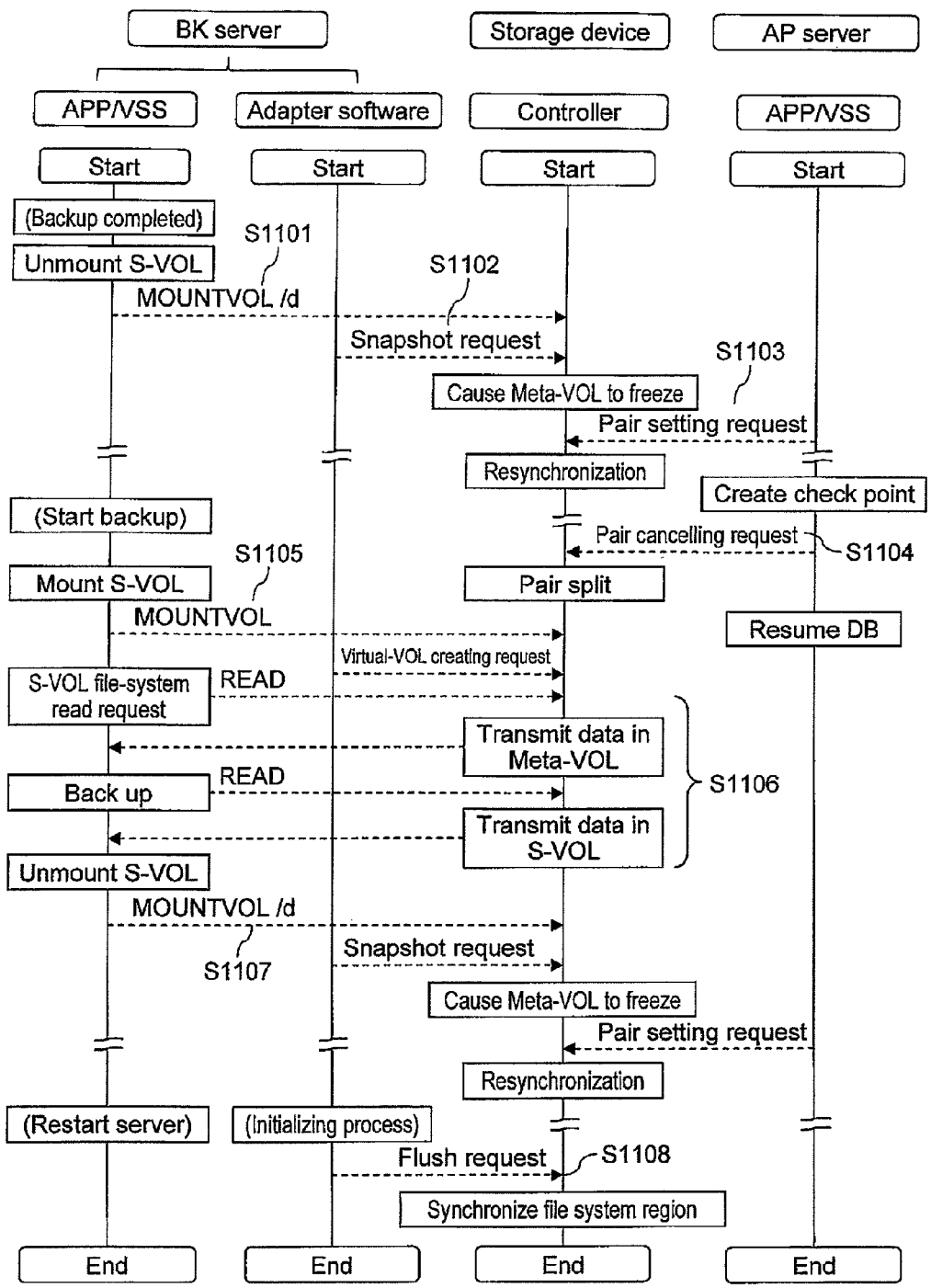
FIG. 11 is a sequence diagram explaining operations of the devices at the time when the backup server 300 carries out a backup.

FIG. 11 is a sequence diagram explaining operations of the devices at the time when the backup server 300 carries out the backup. Hereinafter, steps of FIG. 11 will be explained.

(FIG. 11: Step S1101)

It is assumed that Steps (1) to (4) explained in FIG. 6A to FIG. 6B have already been completed. When the backup process is completed, the backup server 300 unmounts the backup target volume (in this case, the secondary volume). In this process, the service 372 issues the mountvol/d command to the storage device 100. The present step corresponds to a first stage of Step (5) explained in FIG. 6B.

(FIG. 11: Step S1102)

The adapter software 371 on the backup server 300 orders the storage device 100 to create a snapshot of the file system information of the backup target volume. The controller 110 creates a snapshot of the file system 1. The present step corresponds to a last stage of Step (5) explained in FIG. 6B.

(FIG. 11: Step S1103)

The service on the application server 200 orders the storage device 100 to resynchronize the primary volume and the secondary volume. The controller 110 carries out resynchronization in accordance with the order. The present step corresponds to Step (6) explained in FIG. 6B.

(FIG. 11: Step S1104)

The DB software 260 on the application server 200 creates a check point of the database. The service on the application server 200 orders the storage device 100 to split the primary volume and the secondary volume from each other. In accordance with the order, the controller 110 causes the pair of the primary volume and the secondary volume to undergo a transition to a pair-split state. The present step corresponds to Step (7) explained in FIG. 6B. After the checkpoint is created, the DB software 260 resumes the database.

(FIG. 11: Step S1105)

The service 372 on the backup server 300 requests the storage device 100 to mount the secondary volume in order to carry out the backup. However, in practice, the storage device is not operated based on the order, but read operations with respect to the file system region as shown at S1106 is carried out. Before this, the adapter software 371 requests the storage device 100 to generate a temporary virtual volume. The present step corresponds to Step (8) explained in FIG. 6C.

(FIG. 11: Step S1106)

When the secondary volume is to be mounted, first, the backup software 360 requests the storage device 100 to read the file system information of the volume. In this process, the controller 110 returns the file system information stored in the metadata volume (operation of providing a temporary virtual volume). As a result, the LSN at the point of unmounting is read as the LSN in the file system region; therefore, inconsistency of the LSN does not occur. With respect to a read request after the file system region of the backup target volume is once read for mounting, the controller 110 returns the data of the secondary volume. The backup software 360 accesses the backup target volume in accordance with the read file system information and reads the backup target data. The controller 110 returns the data in the secondary volume. The present step corresponds to Step (9) explained in FIG. 6D.

(FIG. 11: Step S1107)

When the backup process is completed, the backup server 300 unmounts the backup target volume in a manner similar to Step S1101. Thereafter, processes similar to those of Steps S1102 to S1103 are executed. The present step corresponds to Step (10) explained in FIG. 6D.

(FIG. 11: Step S1108)

When time elapses and the backup server 300 is to be restarted, the adapter software 371 orders the storage device 100 to flush the metadata volume. As explained in Step (11) of FIG. 6D, the controller 110 synchronizes the metadata volume with the secondary volume.

Figure 12:
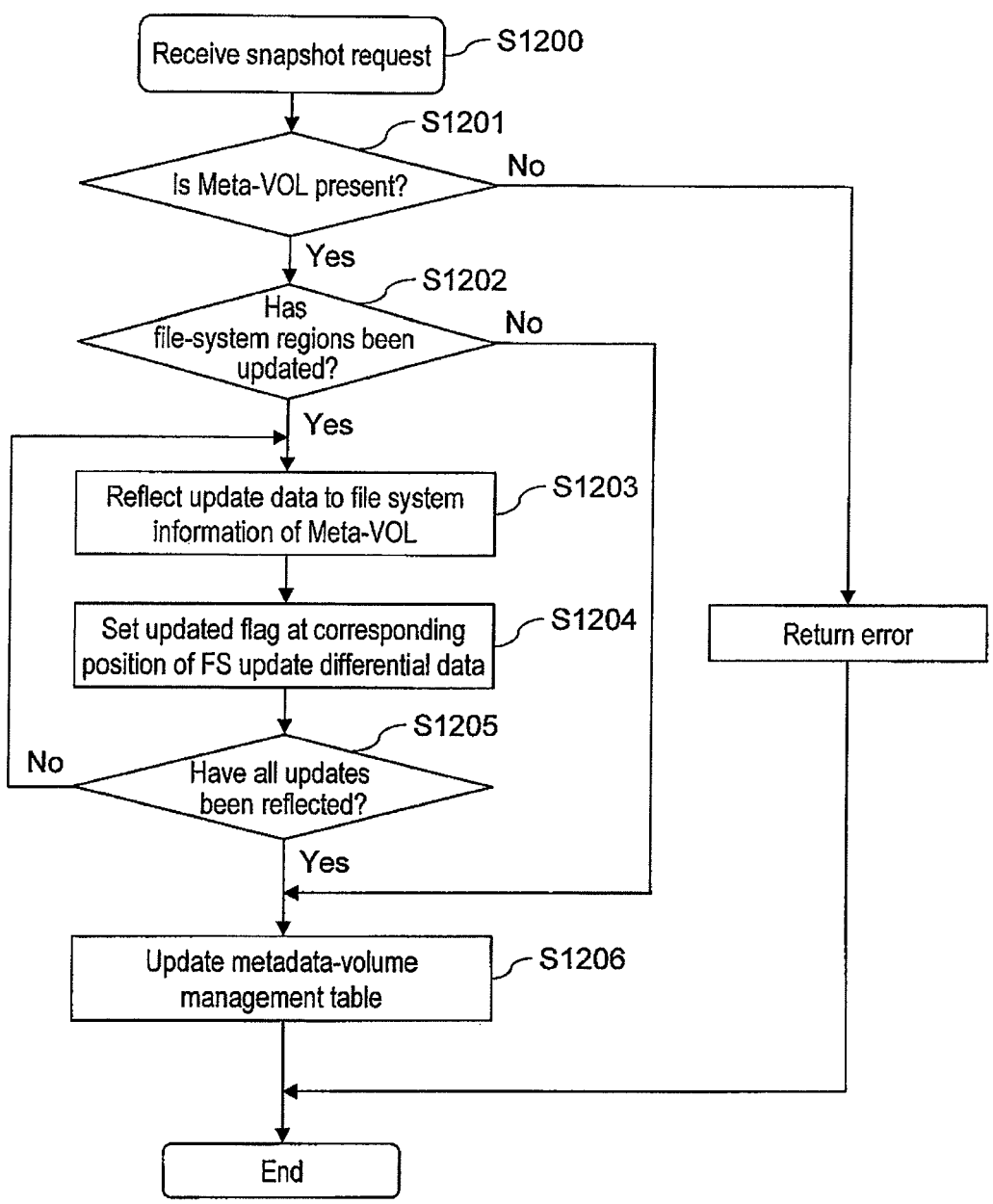
FIG. 12 is a flow chart explaining a process in which the controller 110 creates a snapshot of the metadata volume.

FIG. 12 is a flow chart explaining a process in which the controller 110 creates a snapshot of the metadata volume. The present flow chart corresponds to the process carried out in Step (5) of FIG. 6B. Hereinafter, steps of FIG. 12 will be explained.

(FIG. 12: Step S1200)

The controller 110 starts the present flow chart when the controller 110 receives a request which requests creation of a snapshot of the metadata volume, from the adapter software 371 on the backup server 300.

(FIG. 12: Step S1201)

The controller 110 checks whether the designated metadata volume is present or not. If the volume is not present, an error is returned, and the present flow chart is finished. If the volume is present, the process proceeds to Step S1202.

(FIG. 12: Step S1202)

The controller 110 checks whether the file system information has been updated on the backup server 300 or not. If the information has been updated, the process proceeds to Step S1203. If the information has not been updated, the process skips to Step S1206.

(FIG. 12: Steps S1203 to S1205)

The controller 110 reflects the file system information which has been updated by the backup server 300 to the file system information of the metadata volume (S1203). The controller 110 sets an updated flag at a corresponding position of the file-system update differential data, thereby marking a part serving as a target to be restored later (S1204). In Steps S1203 to S1204, the file system information before the update may be saved in any of memory regions. The controller 110 carries out Steps S1203 to S1204 for all the updates of the file system information (S1205).

(FIG. 12: Step S1206)

The controller 110 clears the number of the consumed blocks 1410 of the metadata-volume management table 140, stores the timestamp designated by the adapter software 371 as the timestamp 1408, and changes the status 1407 to "FREEZE."

Figure 13:
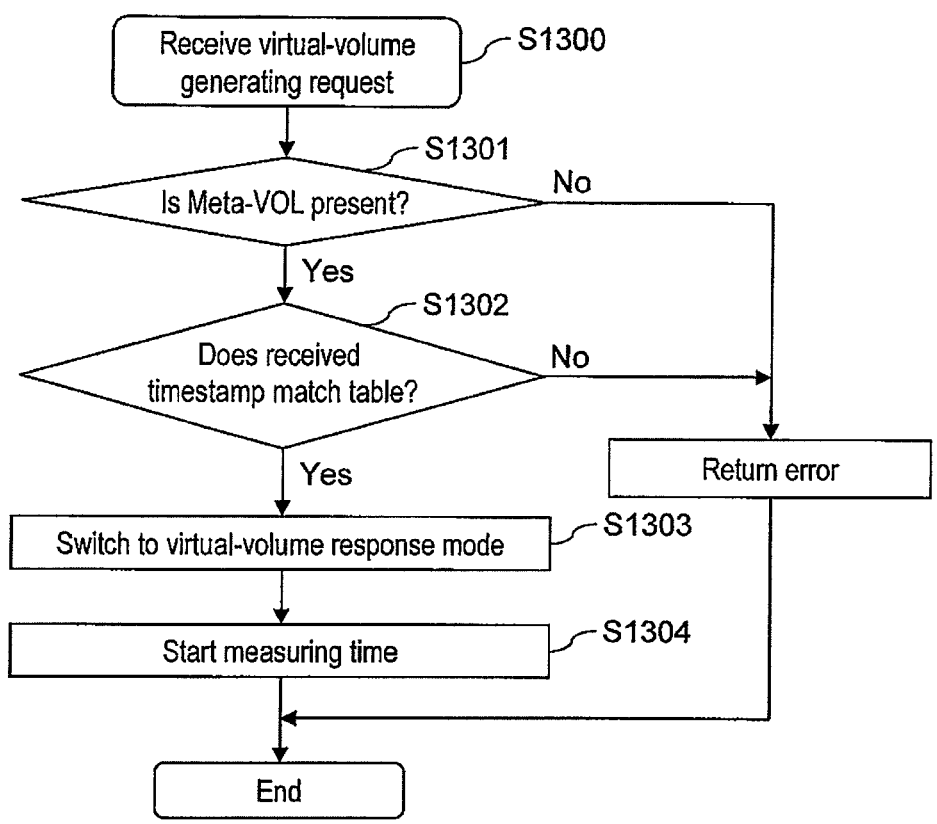
FIG. 13 is a flow chart explaining a process in which the controller 110 creates a virtual volume.

FIG. 13 is a flow chart explaining a process in which the controller 110 creates a virtual volume. The present flow chart corresponds to the process carried out in Step (8) of FIG. 6C. Hereinafter, steps of FIG. 13 will be explained.

(FIG. 13: Step S1300)

The controller 110 starts the present flow chart when the controller 110 receives a request which requests creation of a virtual volume, from the adapter software 371 on the backup server 300.

(FIG. 13: Step S1301)

The controller 110 checks whether a metadata volume corresponding to the designated backup target volume is present or not. If the metadata volume is not present, an error is returned, and the present flow chart is finished. If the metadata volume is present, the process proceeds to Step S1302.

(FIG. 13: Step S1302)

The controller 110 checks whether a record in which the value of the timestamp 1408 matches the timestamp received from the adapter software 371 is present in the metadata-volume management table 140 or not. If there is no matching record, an error is returned, and the present flow chart is finished. If there is a matching record, the process proceeds to Step S1303. If there is no matching record, a process of flushing the metadata volume explained in later-described FIG. 16 may be executed.

(FIG. 13: Step S1303)

The controller 110 carries out switching to an operation mode in which the virtual volume is presented to an external device (in this case, the backup server 300) and, thereafter, responds to the external device by using the virtual volume.

(FIG. 13: Step S1304)

If the virtual volume is permanently reserved, the virtualized file system stored in the metadata volume may be backed up. Therefore, the controller 110 starts a timer in the present step, measures the time during which the virtual volume is kept presented, and, after a predetermined time has elapsed, returns the file system information of the file system 1 even if it is a first read request with respect to the file system region.

Figure 14:
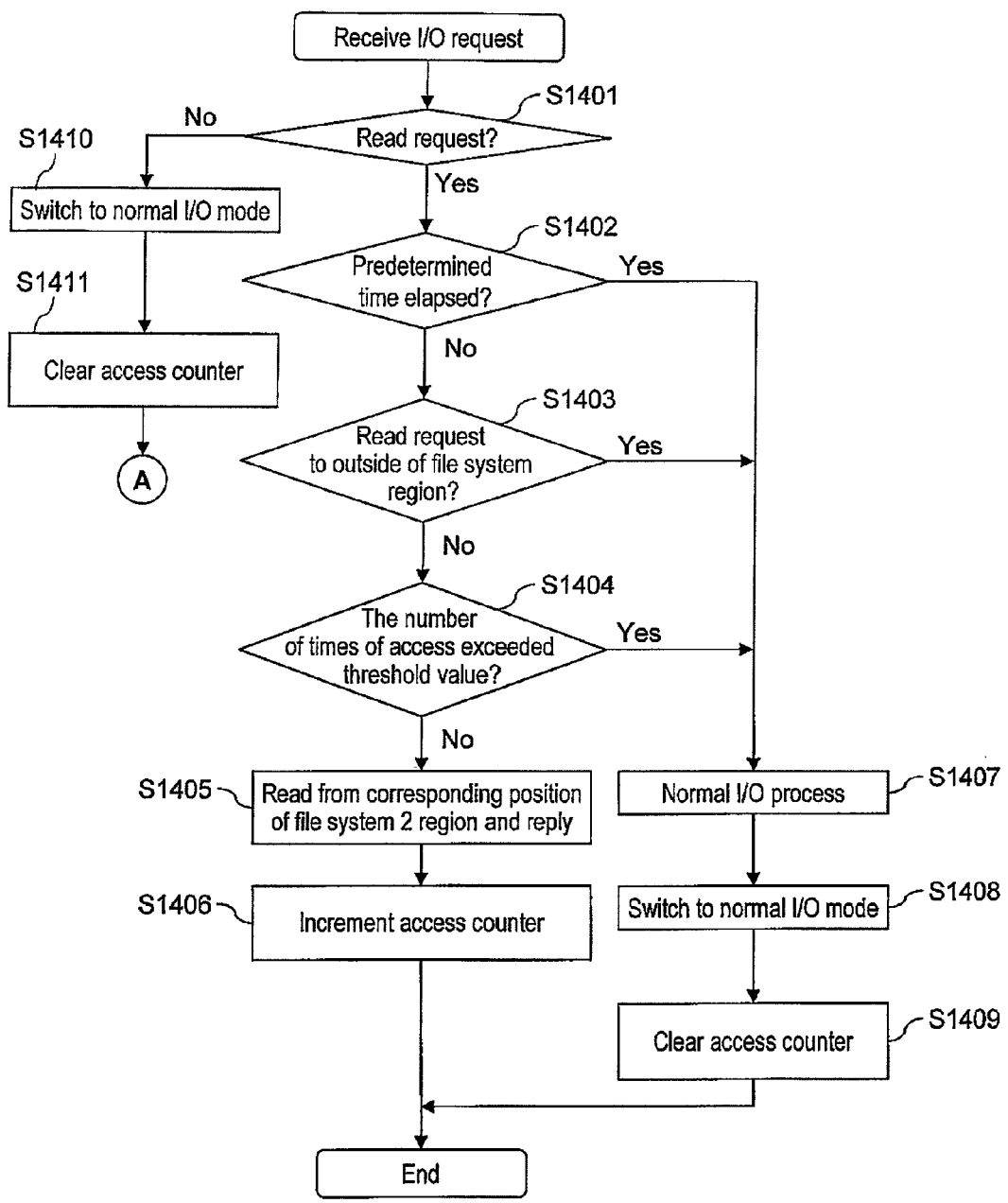
FIG. 14 is a flow chart explaining a process at the time when the controller 110 has received an I/O request with respect to a secondary volume via the virtual volume.

FIG. 14 is a flow chart explaining a process at the time when the controller 110 has received an I/O request with respect to the secondary volume via the virtual volume. The present flow chart corresponds to the processes carried out in Step (8) of FIG. 6C to Step (9) of FIG. 6D. Hereinafter, the steps of FIG. 14 will be explained.

(FIG. 14: Step S1401)

If the received I/O request is a read request, the controller 110 proceeds to Step S1402. Otherwise, the process proceeds to Step S1410.

(FIG. 14: Step S1402)

Based on the time started in Step S1304, the controller 110 determines whether the predetermined time for finishing presentation of the virtual volume has elapsed or not. If the time has elapsed, the process proceeds to Step S1407. If the time has not elapsed, the process proceeds to Step S1403.

(FIG. 14: Step S1403)

The controller 110 determines whether the received I/O request is a read request with respect to a memory region not involving the file system information or not. If it is a read request with respect to a part not involving the file system information, the process proceeds to Step S1407. If it is a read request with respect to the file system information, the process proceeds to Step S1404.

(FIG. 14: Step S1404)

Based on the access counter initialized in Step S907, the controller 110 checks whether the number of times of access with respect to the virtual volume has exceeded a predetermined threshold value or not. If the number has exceeded the threshold value, the process proceeds to Step S1407. If the number has not exceeded the threshold value, the process proceeds to Step S1405.

(FIG. 14: Step S1405 to S1406)

The controller 110 reads the file system information from the position corresponding to the read request in the file system region (file system 2) of the metadata volume and replies to the read request (S1405). The controller 110 increments the access counter with respect to the metadata volume (S1406).

(FIG. 14: Steps S1407 to S1409)

As a normal I/O process without the intermediation of the virtual volume, the controller 110 processes the I/O request with respect to the secondary volume (S1407). The controller 110 cancels the operation mode in which a reply is made via the virtual volume, carries out switching to a normal operation mode (S1408), and clears the access counter with respect to the virtual volume (S1409).

(FIG. 14: Steps S1410 to S1411)

The controller 110 cancels the operation mode in which a reply is made via the virtual volume, carries out the switching to a normal operation mode (S1410), and clears the access counter with respect to the virtual volume (S1411). Thereafter, the process proceeds to a point A of FIG. 15.

Figure 15:
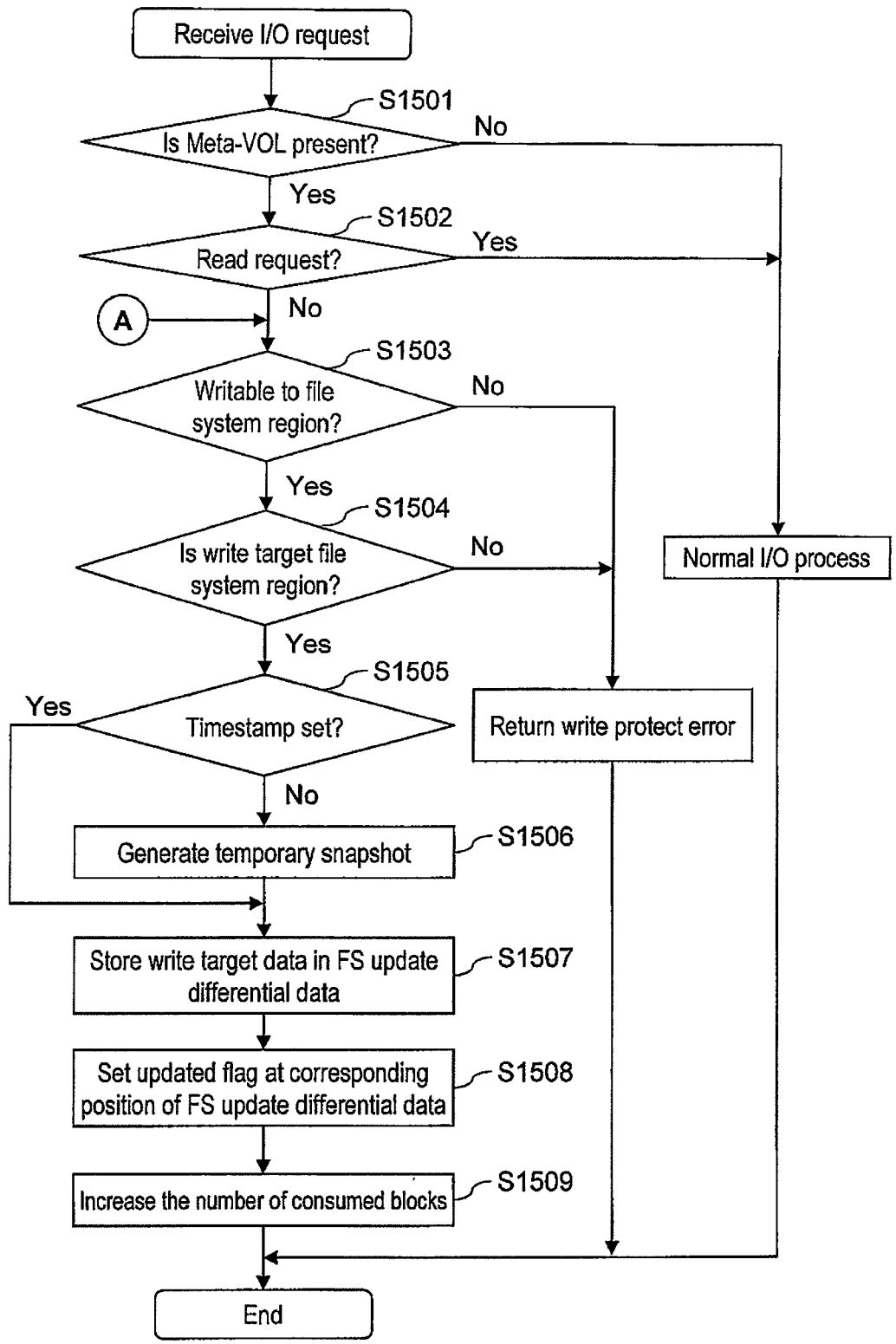
FIG. 15 is a flow chart explaining a process at the time when the controller 110 has received an I/O request with respect to file system information of the secondary volume without the intermediation of the virtual volume.

FIG. 15 is a flow chart explaining a process at the time when the controller 110 has received an I/O request with respect to the file system information of the secondary volume without the intermediation of the virtual volume. Hereinafter, steps of FIG. 15 will be explained.

(FIG. 15: Step S1501)

The controller 110 checks whether a metadata volume corresponding to the volume for which the I/O request has been received is present or not. If the metadata volume is not present, the I/O request with respect to the secondary volume is processed as a normal I/O process without the intermediation of the metadata volume, and the present flow chart is finished. If the metadata volume is present, the process proceeds to Step S1502.

(FIG. 15: Step S1502)

If the received 110 request is a read request, the controller 110 processes the I/O request with respect to the secondary volume as a normal I/O process without the intermediation of the metadata volume and finishes the present flow chart. If the request is not a read request (write request), the process proceeds to Step S1503.

(FIG. 15: Step S1503)

The controller 110 checks whether writing to the file system information of the metadata volume is permitted or not. If the writing is not permitted, a write protect error is returned, and the present flow chart is finished. If the writing is permitted, the process proceeds to Step S1504.

(FIG. 15: Step S1504)

The controller 110 checks whether the write target of the received 110 request is a file system region or not. If the target is not a file system region, a write protect error is returned, and the present flow chart is finished. If the target is a file system region, the process proceeds to Step S1505.

(FIG. 15: Steps S1505 to S1506)

The controller 110 checks whether a record for which the timestamp 1408 has already been set is stored in the metadata-volume management table 140 or not (S1505). If the record has already been stored, the process skips to Step S1507. If the record has not been stored, the file system information of the secondary volume at the current point is generated as a temporary snapshot (S1506).

(FIG. 15: Step S1506: Supplement)

Step S1506 is required, for example, in a case in which a write request with respect to the file system information is generated when, for example, a snapshot of the file system information of the secondary volume has not been created.

(FIG. 15: Steps S1507 to S1509)

The controller 110 stores write target data in the file-system update differential data region (S1507). The controller 110 sets an updated flag at a corresponding position of the file-system update differential data (bitmap information) (S1508). The controller 110 increases the number of the consumed blocks 1410 of the metadata-volume management table 140 in accordance with the write target data (S1509).

Figure 16:
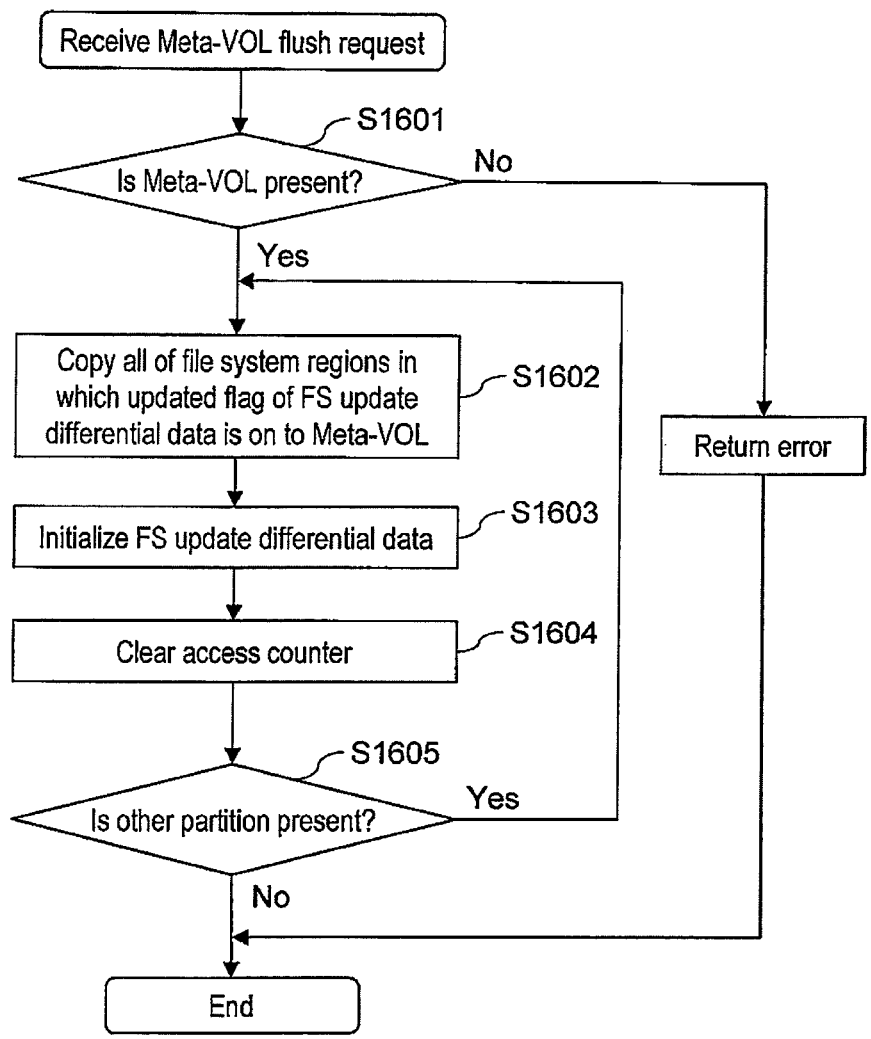
FIG. 16 is a flow chart explaining a process in which the controller 110 flushes the metadata volume.

FIG. 16 is a flow chart explaining a process in which the controller 110 flushes the metadata volume. When the controller 110 receives a request which requests flushing of the metadata volume, the controller 110 starts the present flow chart. The present flow chart corresponds to a process carried out in Step (11) of FIG. 6D. Hereinafter, steps of FIG. 16 will be explained.

(FIG. 16: Step S1601)

The controller 110 checks whether a metadata volume for which the flush request has been received is present or not. If the metadata volume is not present, an error is returned, and the present flow chart is finished. If the metadata volume is present, the process proceeds to Step S1602.

(FIG. 16: Steps S1602 to S1605)

The controller 110 copies all of the data in the file system region for which the updated flag of the file-system update differential data is ON, from the file system region (file system 1) of the secondary volume to the metadata volume (S1602). The controller 110 initializes the file-system update differential data (S1603) and clears the access counter with respect to the virtual volume (S1604). The controller 110 carries out Steps S1602 to S1604 for all of the file systems present in the metadata volume (S1605).

(FIG. 16: Step S1603: Supplement)

In the present step, specifically, the controller 110 clears the file-system update differential data (bitmap information) and clears the number of the consumed blocks 1410 and the timestamp 1408 of the metadata-volume management table 140. The status 1407 is set to a state in which the file system information is written to both of the secondary volume and the metadata volume (double write).

Figure 17:
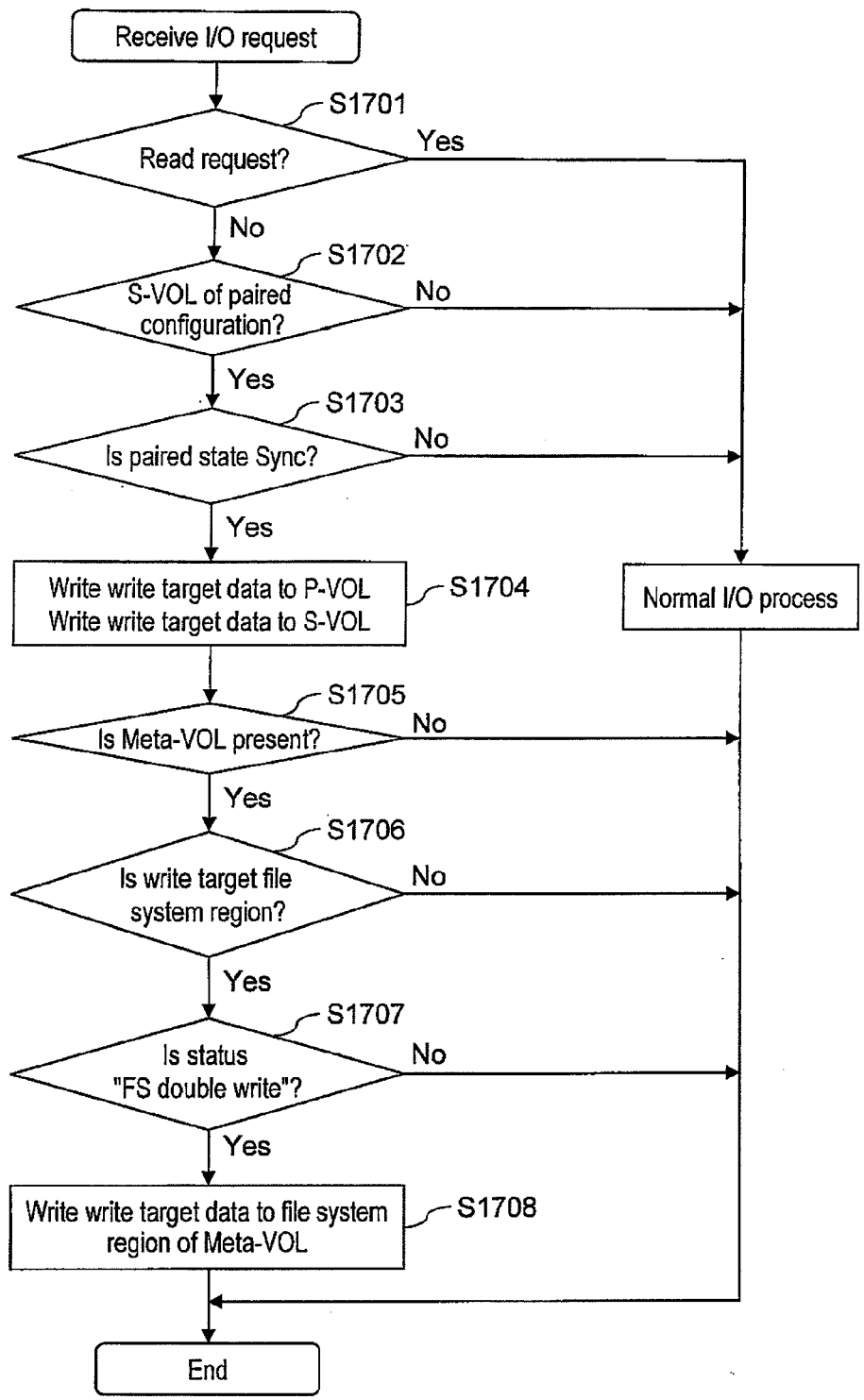
FIG. 17 is a flow chart explaining a process at the time when the controller 110 has received an I/O request with respect to a primary volume.

FIG. 17 is a flow chart explaining a process at the time when the controller 110 has received an I/O request with respect to the primary volume. Hereinafter, steps of FIG. 17 will be explained.

(FIG. 17: Step S1701)

If the received I/O request is a read request, the controller 110 processes the I/O request with respect to the primary volume as a normal I/O process and finishes the present flow chart. If the request is not a read request (write request), the process proceeds to Step S1702.

(FIG. 17: Step S1702)

The controller 110 checks whether a secondary volume configured to be paired with the primary volume is present or not. If the secondary volume is present, the process proceeds to Step S1703. If the secondary volume is not present, the I/O request with respect to the primary volume is processed as a normal I/O process, and the present flow chart is finished.

(FIG. 17: Step S1703)

The controller 110 checks whether the paired state of the secondary volume, which is configured to be paired with the primary volume, is Sync (Synchronized) or not. If Sync, the process proceeds to Step S1704. If not Sync, the I/O request with respect to the primary volume is processed as a normal I/O process, and the present flow chart is finished.

(FIG. 17: Step S1704)

The controller 110 writes the write target data to the primary volume and the secondary volume.

(FIG. 17: Step S1705)

The controller 110 checks whether a metadata volume corresponding to the secondary volume is present or not. If the metadata volume is present, the process proceeds to Step S1706. If the metadata volume is not present, the present flow chart is finished.

(FIG. 17: Step S1706)

The controller 110 checks whether the received I/O request is writing with respect to the file system information or not. If it is writing with respect to the file system information, the process proceeds to Step S1707. If it is not writing to the file system, the present flow chart is finished.

(FIG. 17: Step S1707)

The controller 110 checks whether the status 1407 of the metadata-volume management table 140 is in a state in which the file system information is written to both of the secondary volume and the metadata volume (double write) or not. If it is in the double write state, the process proceeds to Step S1708. If not, the present flow chart is finished.

(FIG. 17: Step S1708)

The controller 110 writes the write target data to the file system region of the metadata volume.

First Embodiment

Summary

As described above, the storage device 100 according to the present first embodiment presents the temporary virtual volume, which has been generated by using the snapshot of the file system information of the secondary volume and the partition region, to the backup server 300. As a result, inconsistency of the log sequence numbers is suppressed, and the backup can be appropriately carried out with respect to the secondary volume.

In the present first embodiment, the snapshot of the file system information of the file system 2 stored in the metadata volume has been individually specified by using the timestamp. However, information other than the timestamp can be used as long as it is identification information by which each snapshot can be uniquely specified. A similar thing applies to the timestamps that designate log sequence numbers in a later-described second embodiment.

In the present first embodiment, the log sequence numbers retained by the NITS file system information for Windows has been shown as examples of the mount information necessary for servers to mount volumes. However, if similar inconsistency occurs when the secondary volume is backed up, inconsistency of other mount information can be also suppressed by using a method similar to that of the present first embodiment.

Second Embodiment

In the first embodiment, occurrence of inconsistency of the file system information along with the backup operation has been explained. Similar inconsistency may occur also when data is to be restored from the backup server 300 to the storage device 100. Therefore, in a second embodiment of the present invention, a configuration example that suppresses inconsistency of file system information caused along a restoring operation will be explained. The configuration related to the restoring operation explained in the present second embodiment can be present in combination with the first embodiment or can be used independently. Hereinafter, the configuration will be explained on the assumption that it is present in combination therewith.

Second Embodiment

Outline of Restoring Operation

Figure 18:
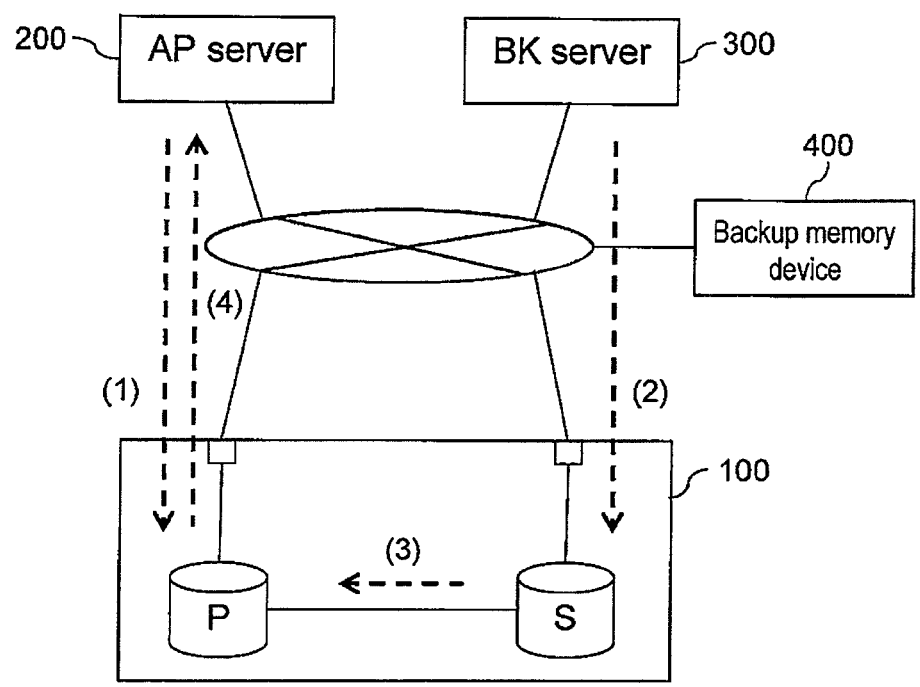
FIG. 18 is a drawing explaining operations of the devices at the time when the backup server 300 carries out restoring.

FIG. 18 is a drawing explaining operations of the devices at the time when the backup server 300 carries out restoring. Hereinafter, an outline of a restoring procedure will be explained in accordance with FIG. 18.

(FIG. 18: Step (1): Unmount Primary Volume)

The backup server 300 starts a restoring process in accordance with, for example, an order from a user. When the service on the application server 200 receives a notification about that from the backup server 300, the service cancels the paired state of the primary volume and the secondary volume and unmounts the primary volume (mountvol/d).

(FIG. 18: Step (2): Restore with respect to Secondary Volume)

The service 372 of the backup server 300 mounts the secondary volume. The backup software 360 writes restore target data which is stored in the backup memory device 400 to the secondary volume.

(FIG. 18: Step (3): Copy Secondary Volume)

The controller 110 copies the secondary volume with respect to the primary volume, thereby synchronizing them. As a result of the present step, the restore target data written to the secondary volume is reflected to the primary volume.

(FIG. 18: Step (4): Mount Primary Volume)

The application server 200 mounts the primary volume. After the present step, the application server 200 can use the data restored onto the primary volume.

The data written back by the restoring has been previously backed up; therefore, the file system information thereof may be different from that of the current primary volume. Therefore, when the file system information of the primary volume is overwritten by the data restored with respect to the secondary volume, inconsistency with the file system information which has been recognized by the application server 200 before the restoring is started may occur. In that case, when the application server 200 is to mount the primary volume in Step (4), the primary volume may be recognized as a volume different from that of the previous time.

It is conceivable to suppress the above-described inconsistency by applying a method similar to that of the first embodiment also to the restoring operation. However, the method of the first embodiment prohibits writing to the file record region of the secondary volume; therefore, if this is to be applied to the restoring operation, writing to the file record region of the primary volume has to be prohibited. As a result, since the application server 200 has the necessity to write data to the primary volume, the write prohibition with respect to the file record region of the primary volume has to be cancelled by, for example, restarting the application server 200 after completion of the restoring, which disturbs system operation.

It is also conceivable to apply the virtual volume explained in the first embodiment also to the restoring operation and continue data writing by the application server 200 via the virtual volume. However, the virtual volume explained in the first embodiment is a combination of the file system information and the file record region extracted from mutually different volumes; therefore, the file system information and the file record region may become inconsistent with respect to each other as a result of the restoring operation. For example, inconsistency that a file that is present on the file system information is not present on the file record region may occur.

Figure 19A:
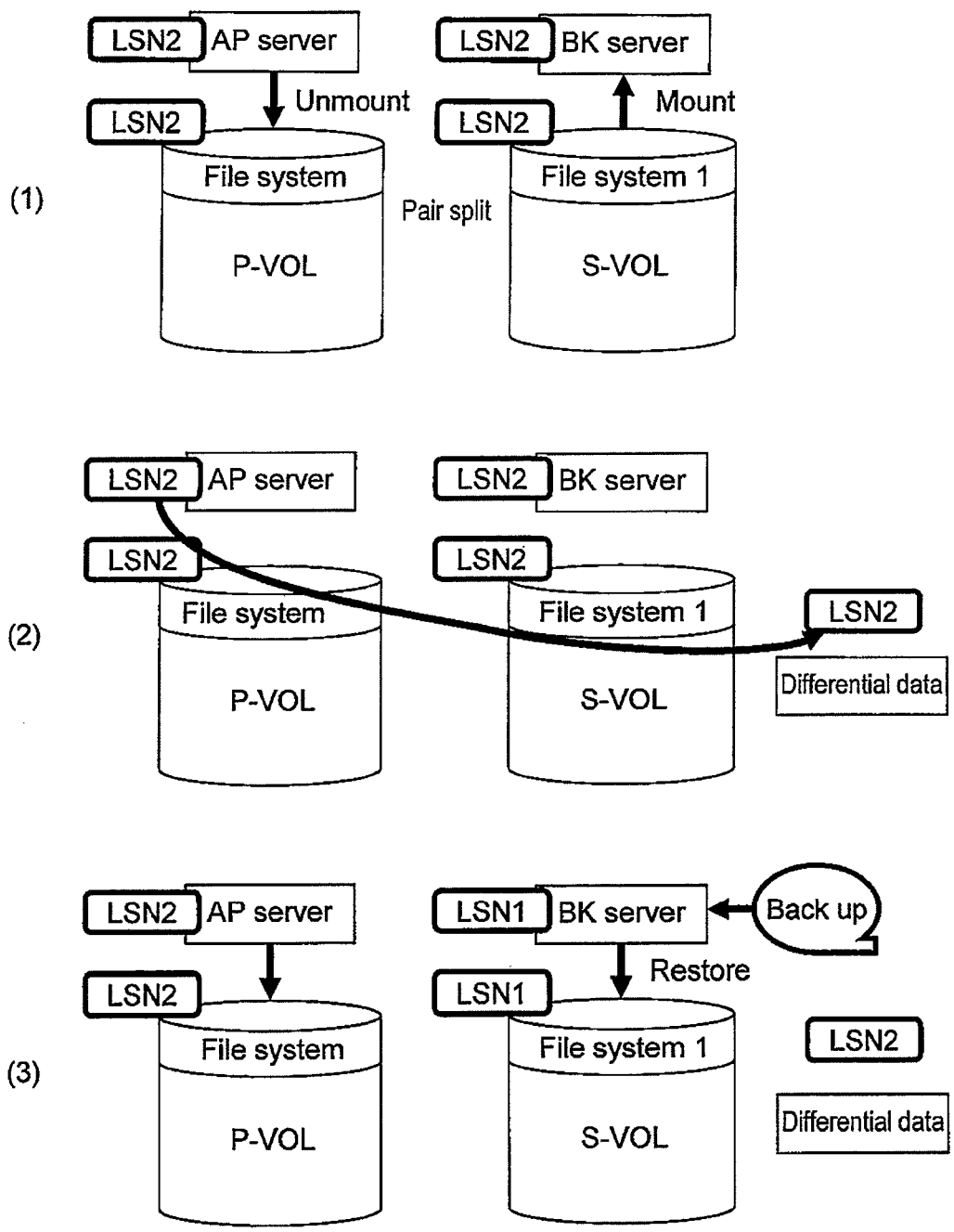
FIG. 19A is drawings explaining a procedure of carrying out restoring while suppressing the above-described inconsistency of the file system information in the computer system 1000 according to a second embodiment.
Figure 19B:
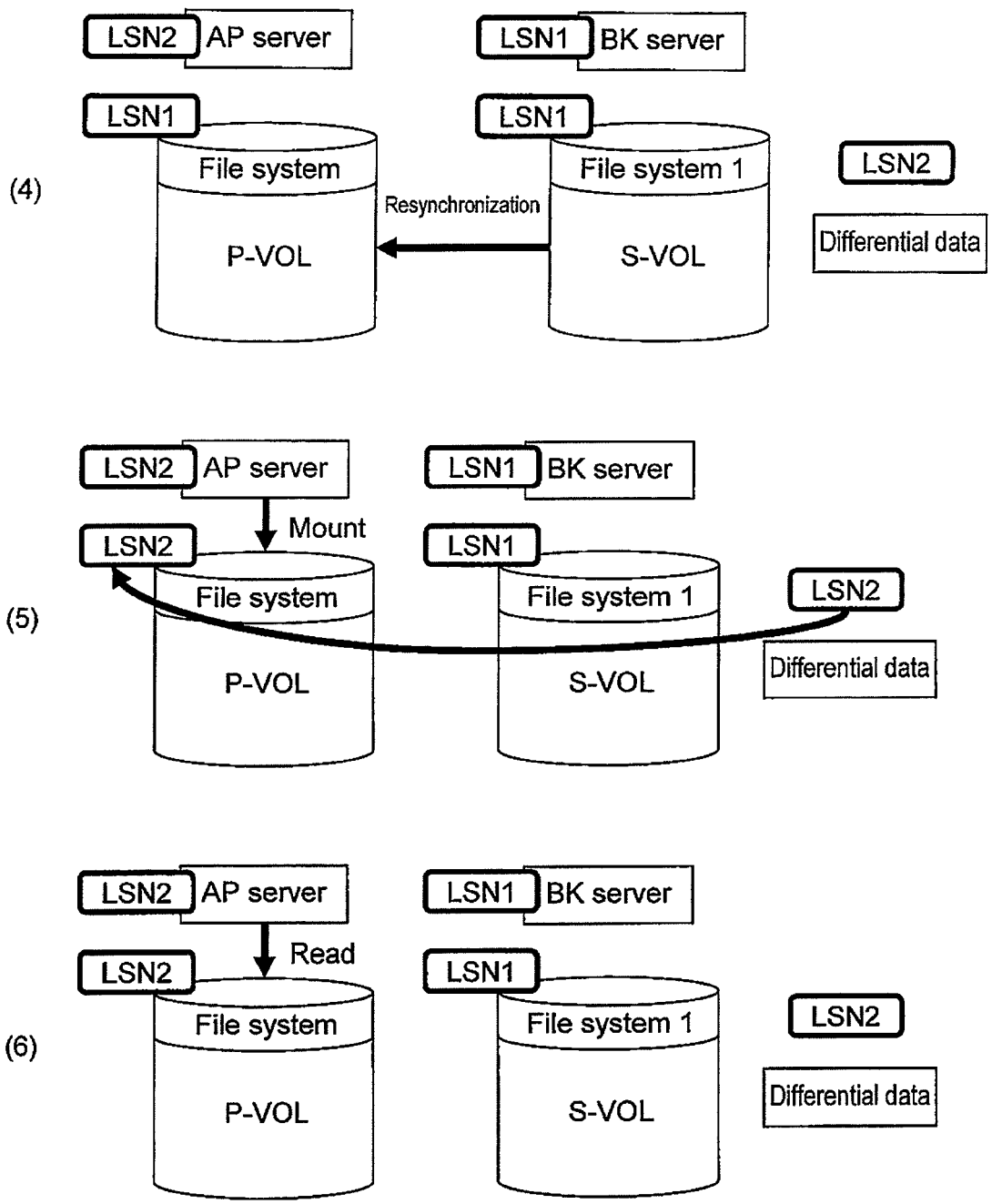
FIG. 19B is drawings explaining a procedure of carrying out restoring while suppressing the above-described inconsistency of the file system information in the computer system 1000 according to the second embodiment.

FIG. 19A to FIG. 19B are drawings explaining procedures of carrying out restoring while suppressing the above-described inconsistency of the file system information in the computer system 1000 according to the present second embodiment. Hereinafter, steps shown in FIG. 19A to FIG. 19B will be explained.

(FIG. 19A: Step (1))

As a result of a manipulation or the like made by an operator, the controller 110 causes the pair of the primary volume and the secondary volume to undergo a transition to a pair-split state. The application server 200 unmounts the primary volume, and the backup server 300 mounts the secondary volume. As a result, the backup server 300 becomes in a state in which restoring can be executed with respect to the secondary volume.

(FIG. 19A: Step (2))

The controller 110 receives the log sequence number of the primary volume which is recognized by the application server 200, from the application server 200 together with a timestamp and stores them in a later-described LSN management table 150. In this process, it is assumed that the log sequence numbers of the primary volume and the secondary volume were LSN2.

(FIG. 19A: Step (3))

The backup software 360 of the backup server 300 reads the restore target data from the backup memory device 400 and writes this to the secondary volume. The restore target data is the data in the secondary volume obtained in the past by the backup software 360; therefore, the log sequence number thereof does not always match the log sequence number of the file system volume 1 at the present point. In this case, it is assumed that the log sequence number of the restore target data was LSN1.

(FIG. 19B: Step (4))

The controller 110 returns the primary volume and the secondary volume to the paired state again. As a result, the log sequence number of the file system 1 is reflected also to the primary volume. At the point of the present step, the log sequence number at the point when the application server 200 unmounted the primary volume and the log sequence number of the current primary volume do not match each other; therefore, in this state, the primary volume cannot be mounted.

(FIG. 19B: Steps (5) to (6))

The controller 110 overwrites the log sequence number which has been stored in the LSN management table 150 in Step (2) to the file system information of the primary volume (Step (5)). As a result, the log sequence number retained by the application server 200 becomes consistent with the log sequence number of the primary volume; therefore, the primary volume can be mounted to normally read data (Step (6)).

FIG. 20 is a drawing showing a configuration of a pair-volume management table 130a and an example of data thereof of the present second embodiment. The pair-volume management table 130a of the present second embodiment has LSN automatic adjustment flags 1311, LSN management tables 1312, and LSN adjustment flags 1313 in addition to the configuration explained in the first embodiment. In FIG. 20, for the convenience of description, part of the field thereof is omitted.

The LSN automatic adjustment flag 1311 is a flag designating, for each pair of the primary volume and the secondary volume, whether the function of causing LSNs to be consistent explained in FIG. 19 is to be carried out or not. The LSN management table 1312 retains entry numbers 1501 on the later-described LSN management table 150 explained in FIG. 21. The LSN adjustment flag 1313 is a flag indicating whether the controller 110 is carrying out the restore function of causing the LSNs to be consistent explained in FIG. 19 or not.

FIG. 21 is a drawing showing a configuration of the LSN management table 150 which is stored in the shared memory 117 in the controller 110, and an example of data thereof. The LSN management table 150 is a table storing the log sequence number of the secondary volume explained in FIG. 19 and has the entry numbers 1501, primary volume IDs 1502, file system IDs 1503, PBS top LBAs 1504, MFT top LBAs 1505, log-file top LBAs 1506, LSN1 stored positions 1507, LSN2 stored positions 1508, LSNs 1509, and timestamps 1510.

The entry number 1501 retains a record number. The primary volume ID 1502 corresponds to the primary volume ID 1301. The file system ID 1503 retains the identification number of the file system stored in the primary volume. The PBS top LBA 1504 and the MFT top LBA 1505 retain start addresses (logical block addresses) of the regions storing the PBS and the MFT in the primary volume, respectively. The log-file top LBA 1506 retains the top address of a memory region in which a transaction log is stored in the primary volume. The LSN1 stored position 1507 and the LSN2 stored position 1508 retain the locations in which an LSN1 (main LSN) and an LSN2 (copy of LSN1) (and the data lengths of the LSNs) are stored in the transaction logs. The LSN 1509 is a value of the LSN in the transaction log. The timestamp 1510 retains the timestamp received from the application server 200.

The explanation of the LSN1 stored position 1507 and the LSN2 stored position 1508 will be supplemented. When the controller 110 obtains a log sequence number on the primary volume, a predetermined position in the primary volume is read. However, if the specifications of the file system are changed due to, for example, version upgrading of the Windows OS, the position at which the log sequence number is stored may be changed; therefore, the function of the controller 110 has to be changed along with this. Therefore, in the present second embodiment, the adapter software of the application server 200 notifies the controller 110 of the position at which the log sequence number is stored, and this is stored in the LSN management table 150. As a result, specification change of the OS, etc. can be flexibly supported.

Figure 22:
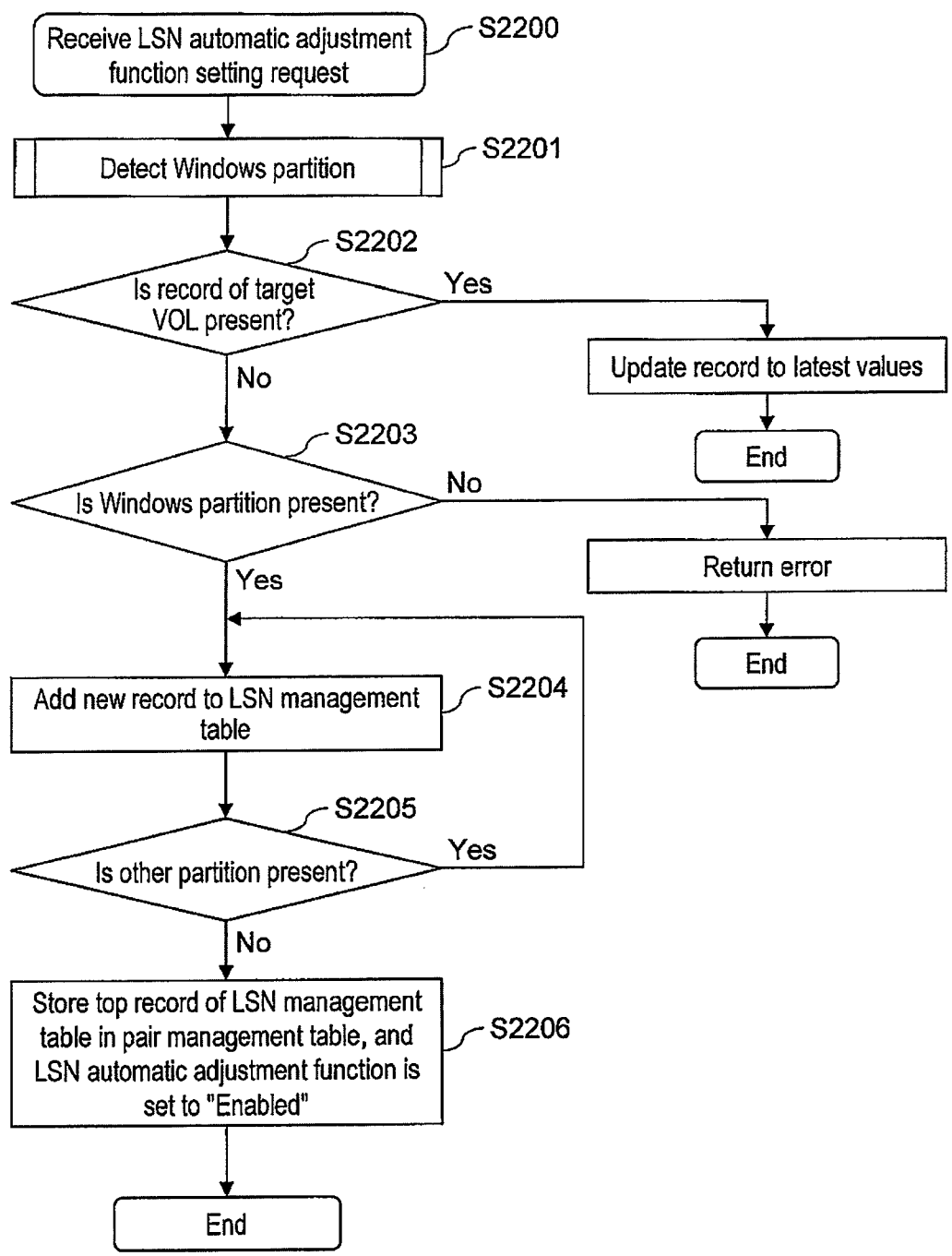
FIG. 22 is a flow chart explaining a process of enabling a function by which the controller 110 causes the LSN explained in FIG. 19 to be consistent.

FIG. 22 is a flow chart explaining a process of enabling the function explained in FIG. 19 in which the controller 110 causes the LSNs to be consistent. Hereinafter, steps of FIG. 22 will be explained.

(FIG. 22: Step S2200)

The controller 110 starts the present flow chart when the controller 110 receives a request which orders to enable the function explained in FIG. 19 in which the LSNs are caused to be consistent, from the adapter software of the application server 200. In this process, the adapter software also transmits unique information of file system specifications such as the log-file top LBA 1506, the LSN1 stored position 1507, and the LSN2 stored position 1508.

(FIG. 22: Step S2201)

The controller 110 detects a file system (in this case, a Windows partition is taken as an example) present in the designated primary volume by using the flow chart explained in FIG. 10. As a result of the present step, the PBS top LBA 1504 and the MFT top LBA 1505 can be also detected.

(FIG. 22: Step S2202)

The controller 110 checks whether records corresponding to the designated primary volume are present in the pair volume management table 130 and in the LSN management table 150 or not. If the records are present, the records are updated to the latest values, and the present flow chart is finished. If the records are not present, the process proceeds to Step S2203.

(FIG. 22: Step S2203)

If the controller 110 has detected the supported file system in Step S2201, the process proceeds to Step S2204. If the file system has not been detected, an error is returned, and the present flow chart is finished.

(FIG. 22: Steps S2204 to S2205)

The controller 110 adds a new record to the LSN management table 150 and stores the PBS top LBA 1504 and the MFT top LBA 1505 detected in Step S2201 and the information received in Step S2200 (S2204). The controller 110 carries out Step S2204 for all the file systems detected in Step S2201 (S2205).

(FIG. 22: Step S2206)

The controller 110 stores the top record of the LSN management table 150 in the pair management table 130a and sets the LSN automatic adjustment flag 1311 to "ENABLED."

Figure 23:
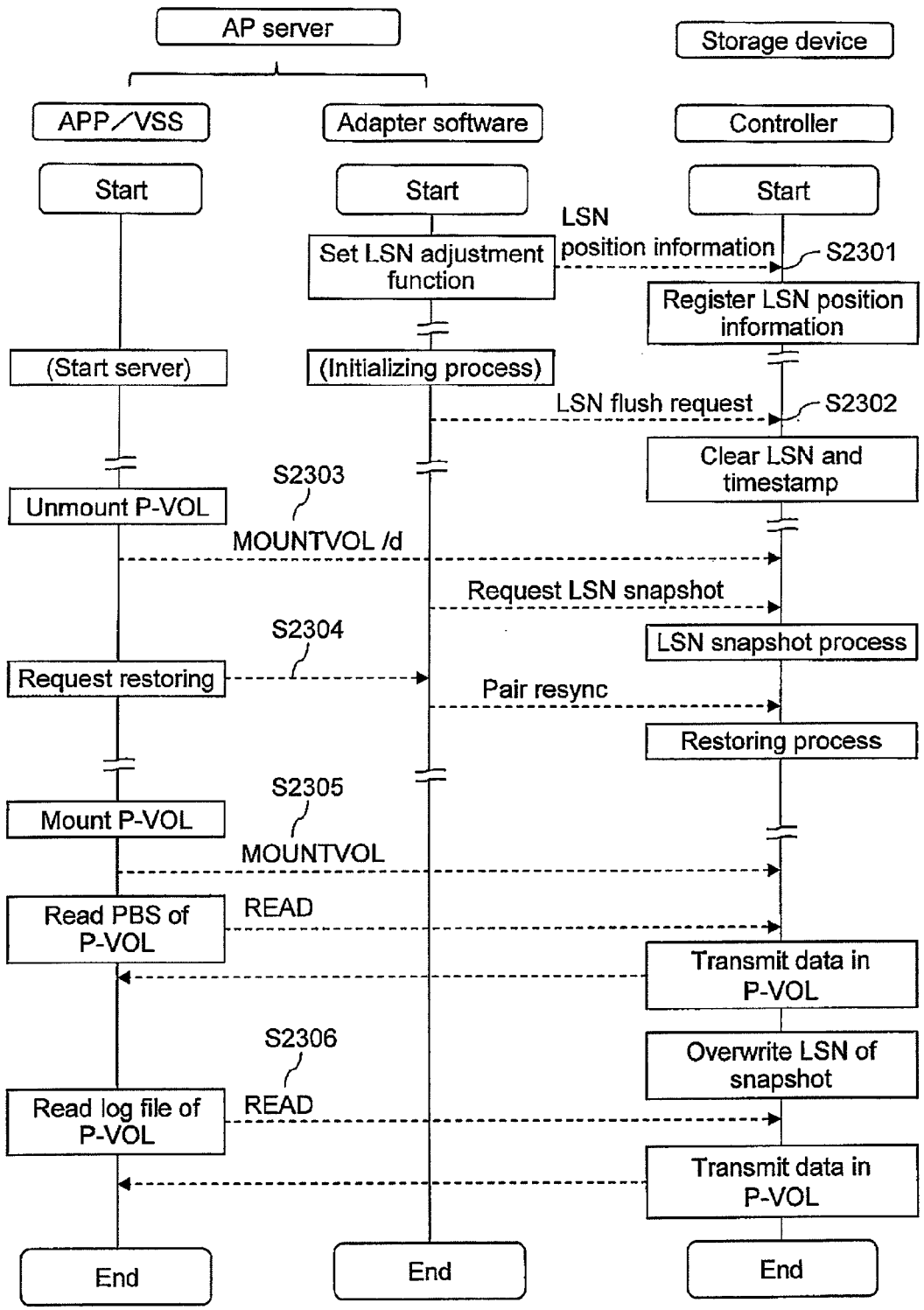
FIG. 23 is a sequence diagram explaining operations of the devices at the time when the backup server 300 carries out restoring.

FIG. 23 is a sequence diagram for explaining operations of the devices at the time when the backup server 300 carries out the restoring. Hereinafter, steps of FIG. 23 will be explained.

(FIG. 23: Step S2301)

The adapter software of the application server 200 transmits a request which orders to enable the function explained in FIG. 19 that causes LSNs to be consistent, to the storage device 100. In accordance with the request, the controller 110 carries out the process explained in FIG. 22.

(FIG. 23: Step S2302)

When the application server 200 is started, the adapter software orders the storage device 100 to initialize the LSN retained by the storage device 100 as an initializing process. The controller 110 clears the LSN 1509 and the timestamp 1510 retained by the LSN management table 150.

(FIG. 23: Step S2303)

The service of the application server 200 requests the storage device 100 to unmount the primary volume to carry out the restoring. The adapter software notifies the storage device 100 of the log sequence number and requests the storage device to save this. The controller 110 stores the log sequence number which has been received from the application server 200, in the LSN management table 150. The present step corresponds to Step (2) explained in FIG. 19A.

(FIG. 23: Step S2304)

The service of the application server 200 orders the adapter software to carry out the restoring. The adapter software orders the storage device 100 to resynchronize the primary volume and the secondary volume. After the restore target data has been written to the secondary volume, the controller 110 resynchronizes the primary volume and the secondary volume. The present step corresponds to Steps (3) to (4) explained in FIG. 19B.

(FIG. 23: Step S2305)

The service of the application server 200 orders the storage device 100 to mount the primary volume. The service of the application server 200 then requests the storage device 100 to read the PBS of the primary volume. The controller 110 returns the PBS of the primary volume. The controller 110 then overwrites the LSN 1509 which is stored in the LSN management table 150 with the file system information of the primary volume.

(FIG. 23: Step S2305: Supplement)

In the present step, the controller 110 recalculates a verification code such as a checksum code of the memory region which is caused along with change of the LSN, based on the changed LSN and stores a correct value.

(FIG. 23: Step S2306)

When data is to be read from the partition region of the primary volume, the service of the application server 200 reads the transaction log of the primary volume in order to check the consistency of the log sequence numbers. The controller 110 returns the transaction log of which the log sequence number has been overwritten. As a result, the inconsistency of the log sequence number can be suppressed. Steps S2305 to S2306 correspond to Step (5) of FIG. 19B.

Figure 24:
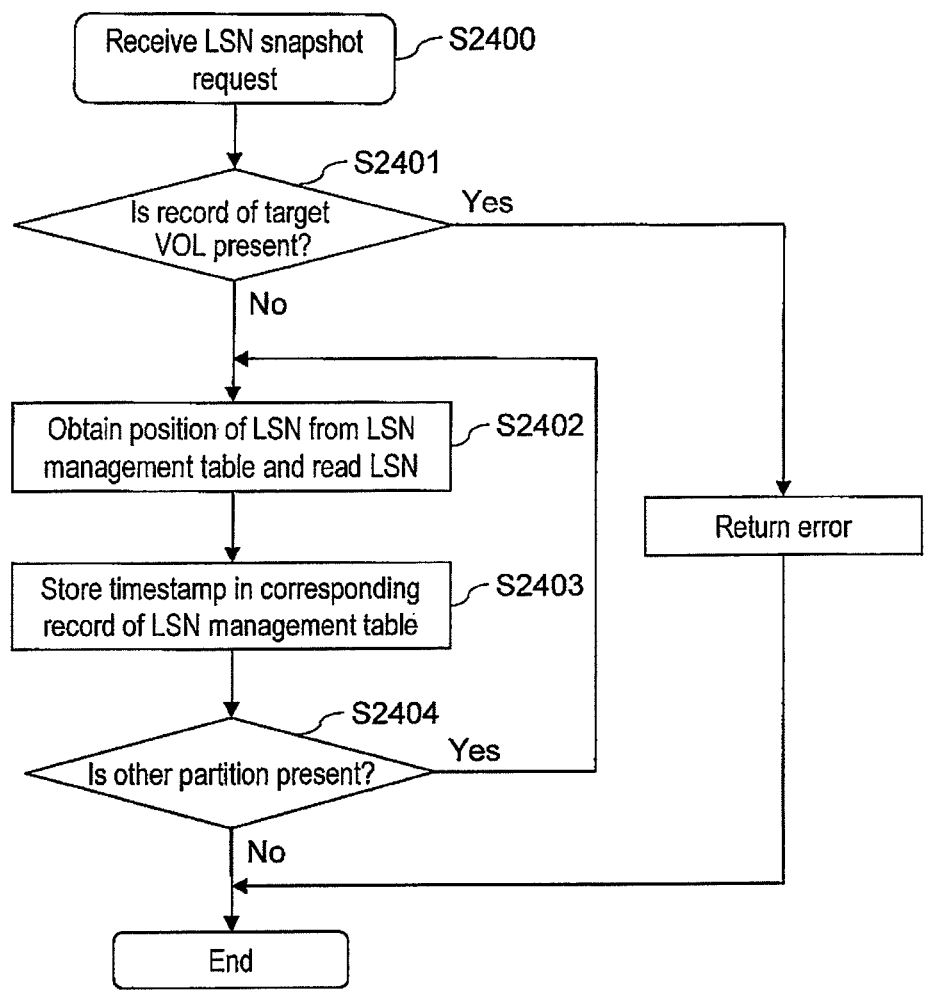
FIG. 24 is a flow chart explaining details of a process carried out by the controller 110 in Step S2303.

FIG. 24 is a flow chart explaining details of the process carried out by the controller 110 in Step S2303. Hereinafter, steps of FIG. 24 will be explained.

(FIG. 24: Step S2400)

The controller 110 starts the present flow chart when the controller 110 receives a notification of the log sequence number from the adapter software of the application server 200 and receives an order to save this.

(FIG. 24: Step S2401)

If a record corresponding to the ordered LSN has been already present in the LSN management table 150, the controller 110 returns an error, and the present flow chart is finished. If the record is not present, the process proceeds to Step S2402.

(FIG. 24: Step S2402 to S2403)

The controller 110 reads the LSN1 stored position 1507 (or the LSN2 stored position 1508) from the LSN management table 150 to obtain the position of the log sequence number and reads the log sequence number from the position (S2402). The controller 110 stores the timestamp which has been received from the application server 200 as the timestamp 1510 of the LSN management table 150 (S2403).

(FIG. 24: Step S2404)

The controller 110 carries out Steps S2402 to S2403 for all the file systems in the primary volume.

Figure 25:
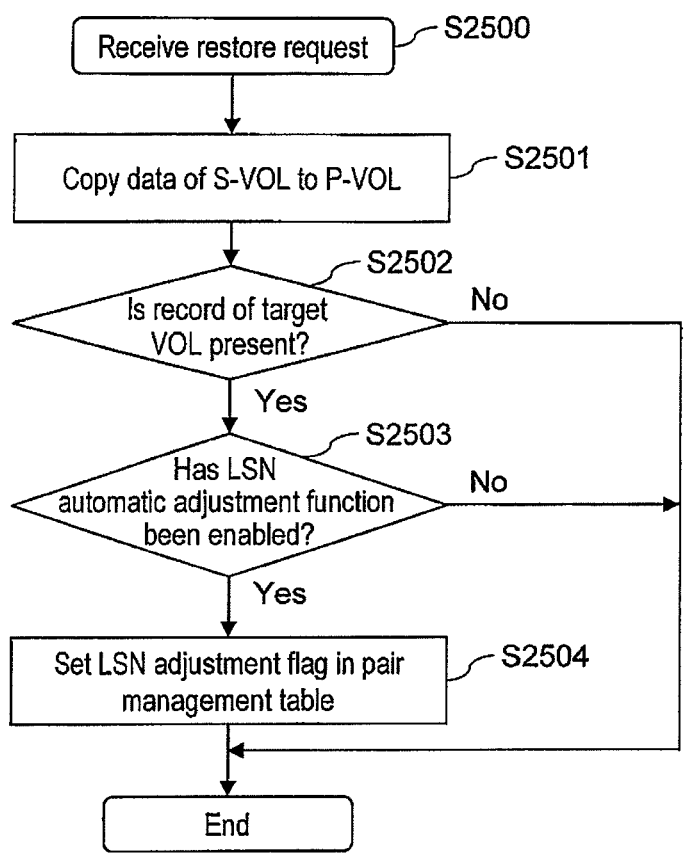
FIG. 25 is a flow chart explaining details of a process carried out by the controller 110 in Step S2304.

FIG. 25 is a flow chart explaining details of the process carried out by the controller 110 in Step S2304. Hereinafter, steps of FIG. 25 will be explained.

(FIG. 25: Steps S2500 to S2501)

The controller 110 starts the present flow chart (S2500) when the controller 110 receives an order to carry out the restoring from the adapter software of the application server

200. The controller 110 copies the data which is stored in the secondary volume to the primary volume (S2501).

(FIG. 25: Step S2502)

The controller 110 checks whether a record corresponding to the primary volume, which is the restore target, is present in the pair management table 130*a* or not. If the record is present, the process proceeds to Step S2503. If the record is not present, the present flow chart is finished.

(FIG. 25: Step S2503)

The controller 110 obtains the LSN automatic adjustment flag 1311 and checks whether the function thereof has been enabled or not. If the function has been enabled, the process proceeds to step S2504. If the function has not been enabled, the present flow chart is finished.

(FIG. 25: Step S2504)

The controller 110 sets the LSN adjustment flag 1313 of the pair management table 130*a* to be "Y."

Figure 26:
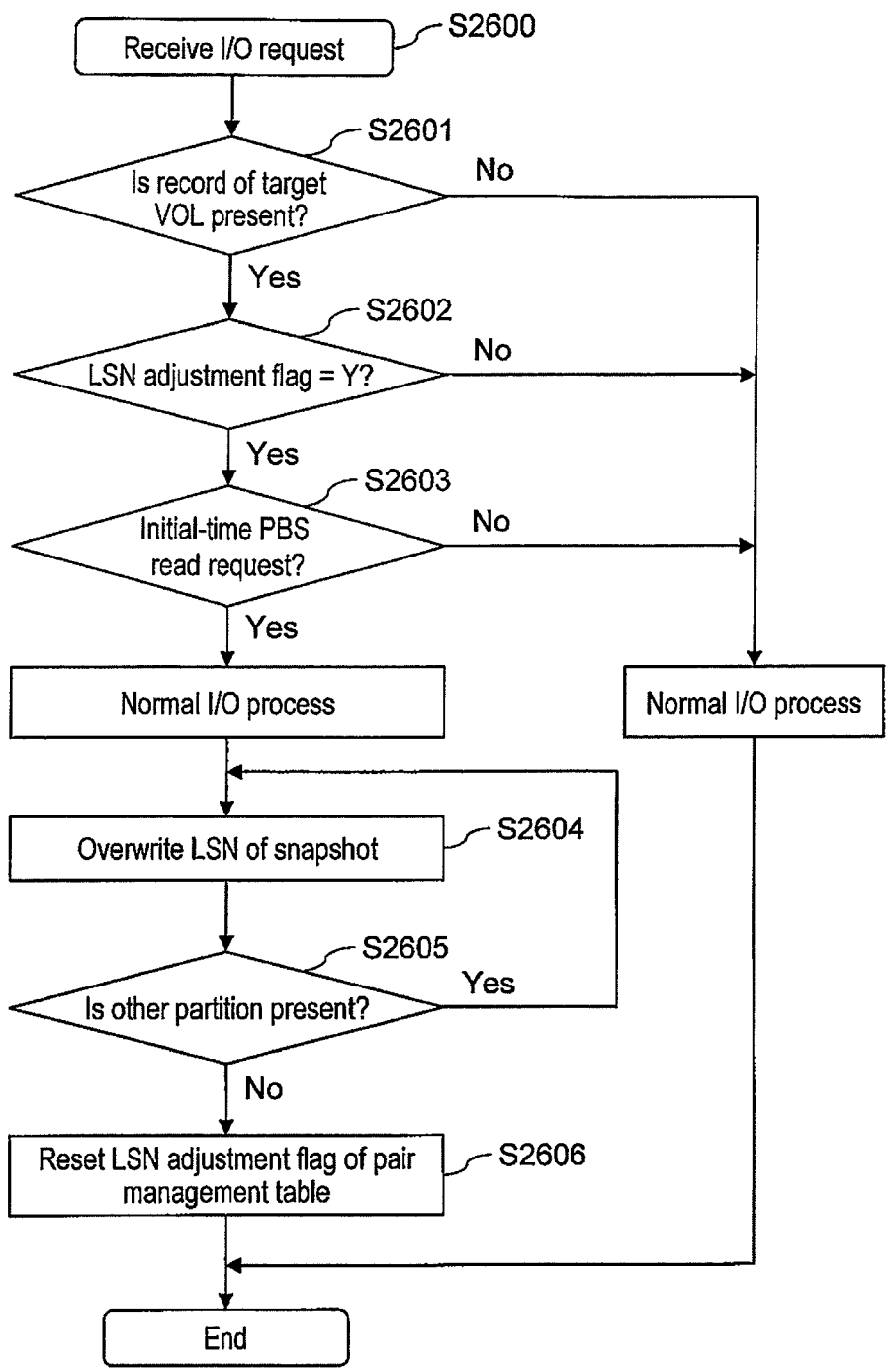
FIG. 26 is a flow chart explaining a process in which the controller 110 causes log sequence numbers in the primary volume to be consistent.

FIG. 26 is a flow chart explaining the process in which the controller 110 causes the log sequence number in the primary volume to be consistent and corresponds to the process carried out in Step S2305. Hereinafter, steps of FIG. 26 will be explained.

(FIG. 26: Step S2600)

The controller 110 starts the present flow chart when an I/O request with respect to the primary volume is received.

(FIG. 26: Step S2601)

The controller 110 checks whether a record in the pair management table 130*a* corresponding to the volume which is the target of the I/O request is present or not. If the record is present, the process proceeds to Step S2602. If the record is not present, the normal I/O process is carried out, and the present flow chart is finished.

(FIG. 26: Step S2602)

The controller 110 checks whether the LSN adjustment flag 1313 of the pair management table 130 is Y or not. If the flag is Y, the process proceeds to Step S2602. Otherwise, the normal I/O process is carried out, and the present flow chart is finished.

(FIG. 26: Step S2603)

The controller 110 checks whether the target of the I/O request is an initial-time read request with respect to the PBS or not. If this condition is satisfied, the normal I/O process is carried out, and the process proceeds to S2604. If this condition is not satisfied, the normal I/O process is carried out, and the present flow chart is finished.

(FIG. 26: Steps S2604 to S2605)

The controller 110 accesses a sector corresponding to the LSN1 stored position 1507 (or the LSN2 stored position 1508) in the transaction log, carries out overwriting at this position with the value of the LSN 1509, and then updates the sector by overwriting (S2604). The controller 110 carries out Step S2604 for all the file systems (S2605).

(FIG. 26: Step S2606)

The controller 110 resets (clears the value of) the LSN adjustment flag 1313 of the pair management table 130*a*.

Figure 27:
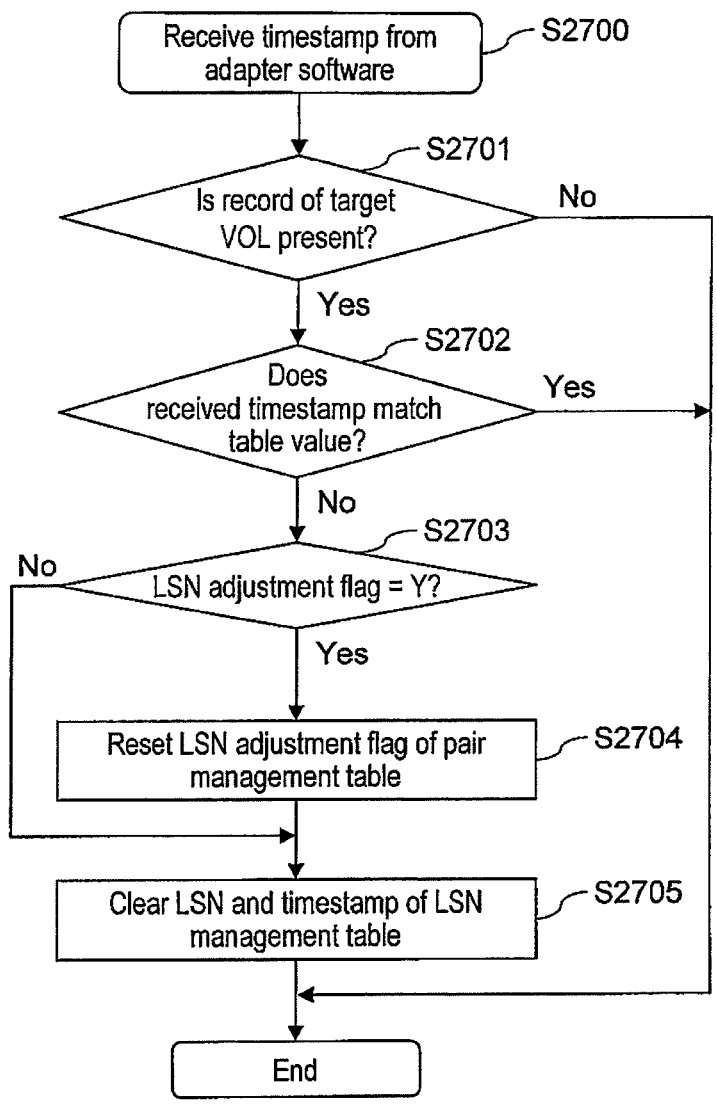
FIG. 27 is a flow chart explaining a process of disabling a function by which the controller 110 causes the LSN to be consistent.

FIG. 27 is a flow chart explaining a process of disabling the function by which the controller 110 causes the LSNs to be consistent. Hereinafter, steps of FIG. 27 will be explained.

(FIG. 27: Step S2700)

The controller 110 starts the present flow chart in parallel with the above-described flow charts when the timestamp is received together with the request for saving the snapshot of the LSN from the adapter software of the application server 200. Specifically, Step S2303 corresponds to this.

(FIG. 27: Step S2701)

The controller 110 checks whether records in the pair management table 130*a* and in the LSN management table 150 corresponding to the volume which is the target for generating the snapshot of the LSN are present or not. If the records are present, the process proceeds to Step S2702. If the records are not present, the present flow chart is finished.

(FIG. 27: Step S2702)

The controller 110 checks whether the timestamp received from the adapter software matches the corresponding timestamp 1510 stored in the LSN management table 150 or not. If they match, the present flow chart is finished. If they do not match, the process proceeds to Step S2703.

(FIG. 27: Step S2703)

The controller 110 checks whether the LSN adjustment flag 1313 of the volume corresponding to the LSN snapshot is Y or not. If Y, the process proceeds to Step S2704. Otherwise, the process skips to Step S2705.

(FIG. 27: Steps S2704 to S2705)

The controller 110 resets (clears the value of) the LSN adjustment flag 1313 (S2704). The controller 110 clears the LSN 1509 and the timestamp 1510 of the LSN management table 150 (S2705).

Figure 28:
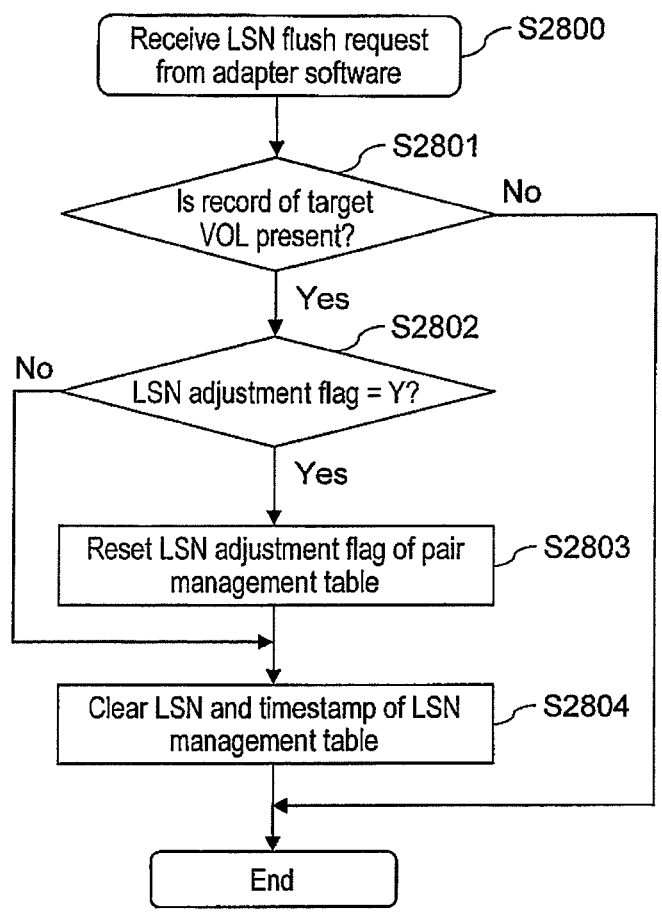
FIG. 28 is a flow chart explaining another process of disabling the function by which the controller 110 causes the LSN to be consistent.

FIG. 28 is a flow chart explaining another process of disabling the function by which the controller 110 causes the LSNs to be consistent. Hereinafter, steps of FIG. 28 will be explained.

(FIG. 28: Step S2800)

The controller 110 starts the present flow chart in parallel with the above-described flow charts when the request for flushing the LSN is received from the adapter software of the application server 200. Specifically, Step S2302 corresponds to this.

(FIG. 28: Step S2801)

The controller 110 checks whether records in the pair management table 130*a* and in the LSN management table 150 corresponding to the volume which is the target for flushing the LSN is present or not. If the records are present, the process proceeds to Step S2802. If the records are not present, the present flow chart is finished.

(FIG. 28: Step S2802)

The controller 110 checks whether the LSN adjustment flag 1313 of the volume corresponding to the LSN flush request is Y or not. If Y, the process proceeds to Step S2803. Otherwise, the process skips to Step S2804.

(FIG. 28: Steps S2803 to S2804)

The controller 110 resets (clears the value of) the LSN adjustment flag 1313 (S2803). The controller 110 clears the LSN 1509 and the timestamp 1510 of the LSN management table 150 (S2804).

Second Embodiment

Summary

As described above, the storage device 100 according to the second embodiment saves the log sequence number at the point when the application server 200 unmounts the primary volume, and overwrites the previously saved log sequence number with the primary volume when the application server 200 is to re-mount the primary volume after completion of the restoring. As a result, the log sequence number which has become inconsistent as a result of the restoring can be recovered to the state at the point of unmounting, and the primary volume can be re-mounted without restarting the OS.

The present invention is not limited to the above-described embodiments, but includes various modification examples. The above-described embodiments have explained in detail in order to understandably explain the present invention, and the present invention is not necessarily limited to those having all the explained configurations. Part of the configurations of either one of the embodiments can be replaced by the configurations of the other embodiment. The configurations of the embodiment can be added to the configurations of the other embodiment. Part of the configurations of each of the embodiments can be subjected to addition/deletion/replacement of other configurations.

Part or all of the above-described configurations, functions, processing units, processing means, etc. may be realized by hardware, for example, by designing with an integrated circuit.

The above-described configurations, functions, etc. may be realized by software by a processor interpreting and executing programs which realize the functions. Information of the programs, tables, files, etc. which realize the functions can be stored in a recording medium such as a memory, hard disk, recording device such as an SSD (Solid State Drive), IC card, SD card, or DVD.

REFERENCE SIGNS LIST

100 Storage device
110 Controller
12 Drive chassis
130, 130a Pair-volume management table
140 Metadata-volume management table
150 LSN management table
200 Application server
260 DB software
300 Backup server
360 Backup software
371 Adapter software
372 Service
400 Backup memory device
500 Network
1000 Computer system

The invention claimed is:

1. A storage device comprising:
a storage unit that stores a primary volume storing data accessed by a first external device and a secondary volume storing data accessed by a second external device; and
a controller that controls access to the primary volume and the secondary volume, wherein
the controller copies the data stored in the primary volume, stores the copied data in the secondary volume, then creates a memory region storing first mount information necessary for the second external device to mount the second volume, associates a snapshot thereof with an identifier of the snapshot, and saves the snapshot and the identifier,
when a request designating the identifier of the snapshot for access to the secondary volume is received from the second external device, the controller generates a virtual volume which can be mounted by the second external device, by using the snapshot corresponding to the designated identifier of the snapshot and using the data stored in the secondary volume, and
the controller presents the generated virtual volume to the second external device as a reply to the request.

2. The storage device according to claim 1, wherein
the controller stores file system information as the first mount information in the memory region, the file system information describing a file system configuration of the secondary volume, and
when the request is received from the second external device, the controller generates the virtual volume composed of the file system information corresponding to the identifier and the data stored in the secondary volume by using the file system information corresponding to the designated identifier of the snapshot and using the data stored in the secondary volume, and presents the virtual volume to the second external device.

3. The storage device according to claim 2, wherein
the controller stores the snapshot in the memory region in accordance with an order from the second external device after the second external device has unmounted the secondary volume in order to carry out a backup.

4. The storage device according to claim 2, wherein
the controller presents the secondary volume to the second external device instead of the virtual volume after the second external device has mounted the virtual volume.

5. The storage device according to claim 2, wherein
when there is writing from the second external device to the file system information of the secondary volume, the controller saves, as the snapshot, a differential between the file system information of the secondary volume after the writing and the file system information stored in the memory region.

6. The storage device according to claim 5, wherein
when the second external device is to be restarted, the controller stores the file system information of the secondary volume in the memory region by overwriting and discards the differential saved as the snapshot.

7. The storage device according to claim 4, wherein
after a predetermined time has elapsed after generation of the virtual volume, the controller presents the secondary volume to the second external device instead of the virtual volume regardless of whether the second external device has mounted the virtual volume or not.

8. The storage device according to claim 4, wherein
the controller presents the virtual volume to the second external device until access from the second external device to the virtual volume reaches a predetermined number of times regardless of whether the second external device has mounted the virtual volume or not.

9. The storage device according to claim 2, wherein
the controller detects the number of file systems in the secondary volume by detecting a data pattern designating a start part of the file system from the data stored in the secondary volume, and
the controller creates the memory region storing the file system information of each of the file systems for every detected file system in the secondary volume.

10. The storage device according to claim 1, wherein
when a restore command requesting the storage device to restore the data backed up by the second external device is received, the controller temporarily saves the second mount information necessary for the first external device to mount the primary volume at the point when the first external device unmounts the primary volume for the restoring, and
when the restoring is completed and the first external device is to re-mount the primary volume, the controller presents the primary volume to the first external device by using the temporarily saved second mount information.

11. The storage device according to claim 10, wherein
at the point when the first external device is to unmount the primary volume, the controller receives the second mount information stored in the file system of the primary volume from the first external device and temporarily saves the second mount information.

12. A method of controlling operation of a storage device comprising
- a storage unit that stores a primary volume storing data accessed by a first external device and a secondary volume storing data accessed by a second external device; and
- a controller that controls access to the primary volume and the secondary volume, the method including:
- a step of copying the data stored in the primary volume, storing the copied data in the secondary volume, then creating a memory region storing first mount information necessary for the second external device to mount the second volume, associating a snapshot thereof with an identifier of the snapshot, and saving the snapshot and the identifier;
- a step of receiving a request designating the identifier of the snapshot for access to the secondary volume from the second external device;
- a step of generating a virtual volume which can be mounted by the second external device, by using the snapshot corresponding to the designated identifier of the snapshot and using the data stored in the secondary volume; and
- a step of presenting the generated virtual volume to the second external device as a reply to the request.

* * * * *